(12) United States Patent
Good

(10) Patent No.: US 12,466,541 B2
(45) Date of Patent: Nov. 11, 2025

(54) PROCESS AND MACHINE FOR ROTATING AND FIXING A STRUCTURE

(71) Applicant: The Boeing Company, Arlington, VA (US)

(72) Inventor: Mark Steven Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 296 days.

(21) Appl. No.: 18/361,445

(22) Filed: Jul. 28, 2023

(65) Prior Publication Data
US 2025/0033759 A1    Jan. 30, 2025

(51) Int. Cl.
*B64C 3/56* (2006.01)

(52) U.S. Cl.
CPC ...................... *B64C 3/56* (2013.01)

(58) Field of Classification Search
CPC ......... E05D 3/18; E05D 11/1007; B64C 3/56; B64C 3/546
See application file for complete search history.

(56) References Cited

U.S. PATENT DOCUMENTS

| | | | | |
|---|---|---|---|---|
| 4,721,016 A | * | 1/1988 | Burandt | F16H 1/46 475/342 |
| 5,518,466 A | | 5/1996 | Tiedeman | |
| 5,558,299 A | * | 9/1996 | Veile | B64C 3/56 244/3.28 |
| 6,032,418 A | * | 3/2000 | Larson | B64C 3/56 74/483 R |
| 6,092,264 A | * | 7/2000 | Banks | F42B 10/14 16/306 |
| 6,554,734 B1 | * | 4/2003 | Maydew | F16H 1/46 475/248 |
| 7,600,297 B2 | | 10/2009 | Gitnes | |
| 9,211,946 B2 | | 12/2015 | Good et al. | |

(Continued)

FOREIGN PATENT DOCUMENTS

EP         3543110 A1 *  9/2019  ............. B64C 3/546

OTHER PUBLICATIONS

"14 CFR 25.783," Fuselage doors, Code of Federal Regulations, updated Jul. 24, 2023, accessed Jul. 26, 2023, Doc. No. 2003-14193, 69 FR 24501, May 3, 2004, 4 pages. https://www.ecfr.gov/current/title-14/chapter-I/subchapter-C/part-25/subpart-D/subject-group-ECFR9bfdfe36b332e4a/section-25.783.

(Continued)

*Primary Examiner* — William L Miller
(74) *Attorney, Agent, or Firm* — Yee & Associates, P.C.

(57) ABSTRACT

Embodiments are shown for a machine and process to rotate and fix a second structure relative to a first structure via a hinge that may include a central axis, a lock-plate, and a moveable, a stationary, and a driving, member. The process may include: attaching a hinge to the first structure; moving a pin, extending parallel to the central axis through the stationary and driving members, out of a first notch of the movable member toward the central axis via rotating the driving member around the central axis; rotating the movable member via rotating the second structure around the central axis; fixing the movable member by latching the hinge via moving the pin away from the central axis and into a second notch in the movable member; and locking the latch by moving, along a length of the central axis, the lock-plate toward the driving member and the pin.

20 Claims, 29 Drawing Sheets

(56) References Cited

U.S. PATENT DOCUMENTS

| | | | |
|---|---|---|---|
| 9,249,861 B2* | 2/2016 | Fedosovsky | F16H 57/021 |
| 9,290,260 B2 | 3/2016 | Lassen et al. | |
| 9,296,469 B2 | 3/2016 | Santini et al. | |
| 9,415,857 B2 | 8/2016 | Fox et al. | |
| 9,469,392 B2 | 10/2016 | Fox et al. | |
| 9,499,252 B2 | 11/2016 | Lassen et al. | |
| 9,643,716 B2* | 5/2017 | Sheahan, Jr. | B64C 9/02 |
| 9,950,780 B2 | 4/2018 | Santini et al. | |
| 10,370,083 B2 | 8/2019 | Fox et al. | |
| 10,518,864 B2 | 12/2019 | Lassen et al. | |
| 11,319,053 B2* | 5/2022 | Morrell | B64C 23/072 |
| 11,325,693 B2* | 5/2022 | Lorenz | B64C 3/56 |
| 11,440,638 B2* | 9/2022 | Lorenz | B64C 1/30 |
| 2008/0047100 A1* | 2/2008 | Gitnes | B64C 3/56 |
| | | | 16/221 |
| 2013/0313356 A1* | 11/2013 | Santini | B64C 3/56 |
| | | | 244/49 |
| 2014/0014768 A1* | 1/2014 | Lassen | B64C 3/56 |
| | | | 244/49 |
| 2015/0014478 A1* | 1/2015 | Lassen | B64C 3/56 |
| | | | 244/49 |
| 2016/0362171 A1* | 12/2016 | Lassen | B64C 3/56 |
| 2017/0349296 A1* | 12/2017 | Moy | G07C 5/0808 |
| 2023/0150652 A1* | 5/2023 | Harrison | B64C 13/34 |
| | | | 244/99.2 |

OTHER PUBLICATIONS

Bahrami, "Fuselage Doors and Hatches," Advisory Circular, AC 25.783-1A, U.S. Department of Transportation, Federal Aviation Administration, dated Apr. 25, 2005, 19 pages.

* cited by examiner

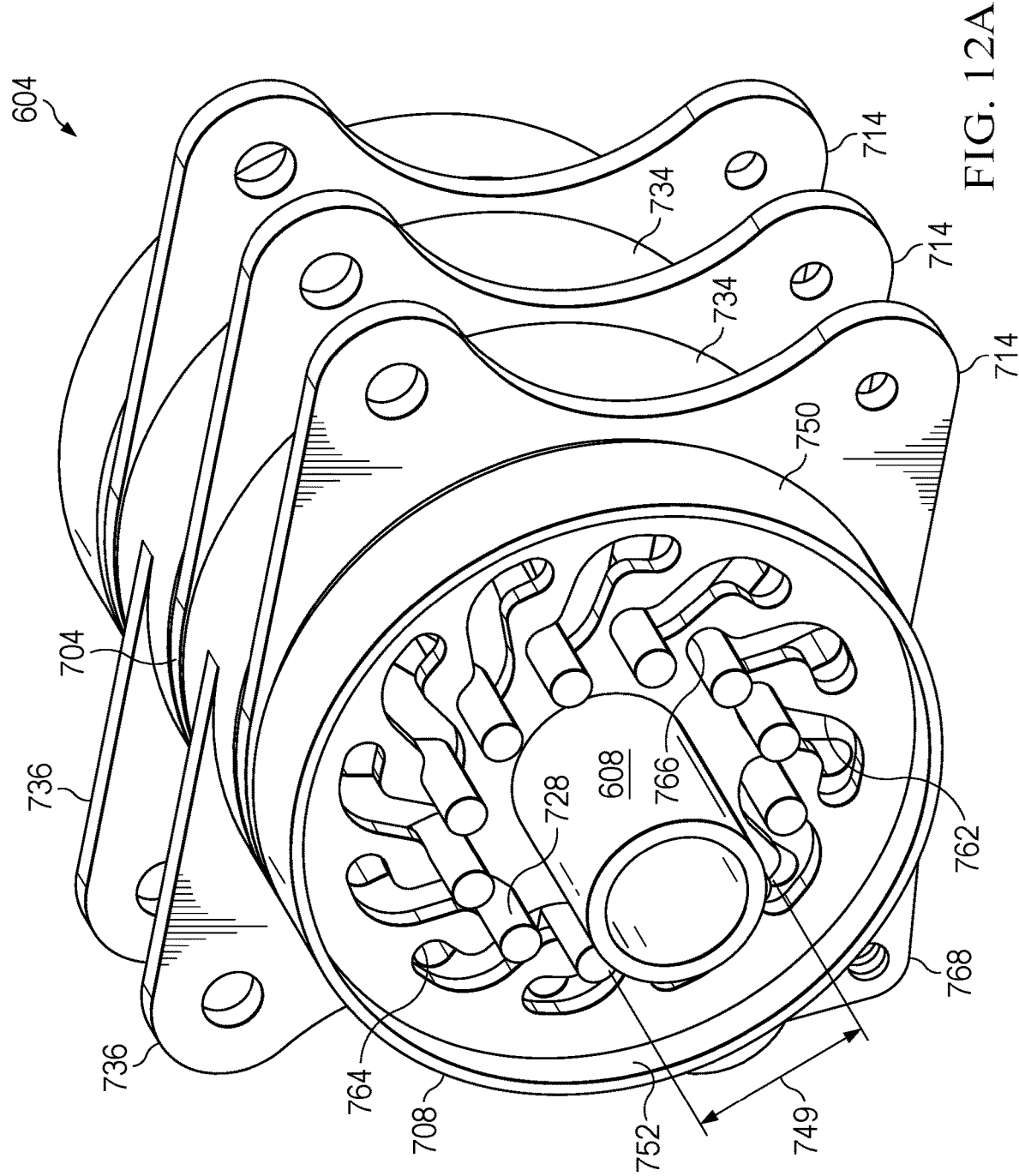

PROCESS AND MACHINE FOR ROTATING AND FIXING A STRUCTURE

BACKGROUND INFORMATION

1. Field

This disclosure relates to a process and machine for rotating an object relative to another object. More specifically, the object rotated may be connected to a second object that does not rotate relative to the first object.

2. Background

Numerous applications require a structure to rotate relative to an adjacent structure. In aviation, aircraft with longer wingspans tend to be more fuel efficient. However, taxiway spacing and gate locations for most airports do not provide adequate spacing for aircraft with long wingspans that can be produced with today's technology.

Thus, it may be necessary to provide an aircraft that can benefit from a long wingspan in flight, while being able to reduce the wingspan while operating at an airport. Current machines and/or processes for reducing a wingspan of the aircraft at an airport, such as without limitation, a rotary gear actuator, for reducing a wingspan on an airport that may result in increasing a thickness, weight, and/or drag of a wing and/or components thereof, greater than desired. Hence, technological improvement is needed for a machine and process for rotating one structure relative to another structure from one fixed position to another fixed position.

SUMMARY

The illustrative embodiments provide for a novel machine and process of rotating a structure relative to another structure. The illustrative embodiments provide for a machine and process for rotating and fixing a wing that may move a second portion of a wing with respect to a first portion of the wing at a selected angle.

Described and illustrated herein is at least an embodiment for a machine and manufacture that may include a hinge that may include: a cylinder that may include a central axis; a movable member centered around the central axis, wherein the movable member may include an interior-extension that may include a first notch and a second notch and a central opening; a stationary member centered around the central axis, wherein the stationary member may include a slot that comprise an oblong shape that extends radially away from the central opening; a driving member centered around and configured to rotate about the central axis, wherein the driving member may include a curved slot; a pin, aligned parallel to the central axis, that extends through the slot and the curved slot; and a lock-plate centered around the central axis. The lock-plate may include: a central opening configured to surround, rotate around, and translate along a length of, the cylinder. The hinge may also include lock-disc that extends from one side of the lock-plate.

The hinge may also include: a set of fixed-lugs extend from the stationary member configured to secure the stationary member to a first structure; the stationary member further may include a central opening configured to surround the cylinder; a set of latch-lugs extend from the stationary member configured to secure the stationary member to a second structure; and a diameter of the pin may be less than a width the slot. The stationary member may include a plurality of slots and a width of each of the slots may be identical to a width of each slot in the plurality of slots and also greater than a diameter of the pin.

Further, a plurality of the stationary member may be configured to retain the pin to transmit torque in double-shear. There may be additional notches in the movable member. A rotation actuator may be connected to the movable member, and hence the manufacture of the hinge may become a part of a machine configured to rotate a second structure relative to a first structure. There may be a plurality of the driving member, and a shaft that connects each of the plurality of the driving member to each other.

In the hinge, a height of the lock-disc may exceed a distance that the pin extends beyond the curved slot. Each of the notches may be sized to receive the pin. The curved slot may include a latched position and an unlatched position.

Described and illustrated herein is at least an embodiment for a machine and manufacture that may include: an actuator configured to rotate a second structure relative to a first structure; and a hinge that may include: a cylinder that may include a central axis; a movable member centered around the central axis, wherein the movable member may include an interior-extension that may include a first notch and a second notch and a central opening; a stationary member centered around the central axis, wherein the stationary member may include a slot that comprise an oblong shape that extends radially away from the central opening; a driving member centered around and configured to rotate about the central axis, wherein the driving member may include a curved slot; a pin aligned parallel to the central axis and retained within the slot and the curved slot; and a lock-plate centered around the central axis, wherein the lock-plate may include: a central opening configured to surround, rotate around, and translate along a length of, the cylinder; and a lock-disc that extends from one side of the lock-plate. The cylinder may retain a drive shaft for a rotary actuator. A second latch may be mounted on the cylinder. The first structure may be a wing box and the second structure may be a rotatable portion of a wing.

The hinge of the machine and manufacture may also include: a number of pins, wherein each pin in the number of pins may include an identical size and a width less than a width of the slot; and a number of slots equal to or greater than the number of pins, wherein a width of each slot in the number of slots is identical to each other. A height of the lock-disc may exceed a distance that a pin of the number of pins extends beyond the driving member.

Described and illustrated herein is at least an embodiment for a machine and manufacture that may execute a process for rotating and fixing a second structure relative to a first structure. The process may include: connecting a rotation actuator to the second structure; attaching a hinge to the first structure and the second structure; moving a pin, extending parallel to a central axis of the hinge and through a stationary member of the hinge and a driving member of the hinge, out of a first notch of a movable member of the hinge and toward the central axis of the hinge via rotating the driving member of the hinge around the central axis; rotating the movable member via the rotation actuator rotating the second structure around the central axis. The process for rotating and fixing a second structure relative to a first structure may further include fixing the movable member at a desired rotation by latching the hinge via moving the pin away from the central axis and into a second notch in the movable member; and locking the latch by moving, along a length of the central axis, a lock-plate of the hinge toward the driving member and the pin.

Additionally, the process for rotating and fixing a second structure relative to a first structure may further include at least moving the lock-plate of the hinge toward the driving member and the pin by rotating the lock-plate around the central axis and/or indicating when the pin may be locked or unlocked. The process may also include forming the pin with dimensions and a material configured for carrying loads from the second structure with the pin in the first notch or the second notch.

Further, the features and functions described above and below can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments may be set forth in the appended claims. The illustrative embodiments, however, as well as a preferred mode of use, further objectives and features thereof, may be understood by reference to the following detailed description of an illustrative embodiment of the present disclosure when read in conjunction with the accompanying drawings, wherein:

FIG. 12A is a perspective view of a portion of a rotalatch in a flight position and unlatched without support-ring or a lock-disc in accordance with an illustrative embodiment;

DETAILED DESCRIPTION

Descriptions herein recognize and take into account that a machine and process may be required to rotate one structure relative to an adjacent structure. Descriptions herein recognize and take into account that a machine and process may be required to rotate one structure relative to an adjacent structure and be positively fixed at a desired amount of angular travel. As used herein, the terms fixed and fixing herein refer to keeping motion of one structure stopped relative to the adjacent structure. Descriptions herein recognize and take into account that a machine and process may be required to rotate one structure relative to an adjacent structure and carry loads on the structure that provides a desired level of power and strength, but with a reduced profile and/or increased reliability and/or increased lifespan than currently available technology provides.

Without limitation, regulations, operational considerations, and/or desired features expected/required in newly designed aircraft may necessitate additional (relative to current aircraft) layers of redundancy that ensure the system remains fixed and latched in a selected position. Descriptions herein recognize and take into account that longer wingspans on an aircraft may increase a fuel efficiency of an aircraft but may exceed operational capacity at many airports.

Descriptions herein recognize and take into account that some military aircraft may fold wingtips up, but current wing fold technology may produce weight, drag, reliability, or maintenance access penalties that are not efficient or desirable, and may lack desirable redundancy and/or reliability features. Without limitation, current wingtip rotation devices may be of a size that requires a fairing to be added onto a wing to cover a component of the rotation device that exceeds a thickness of the wing. Without limitation, current wingtip rotation devices may be of a design that requires a size and/or weight of materials that may be greater than desired to carry loads generated on the wingtip rotation devices during flight.

Figure 1:
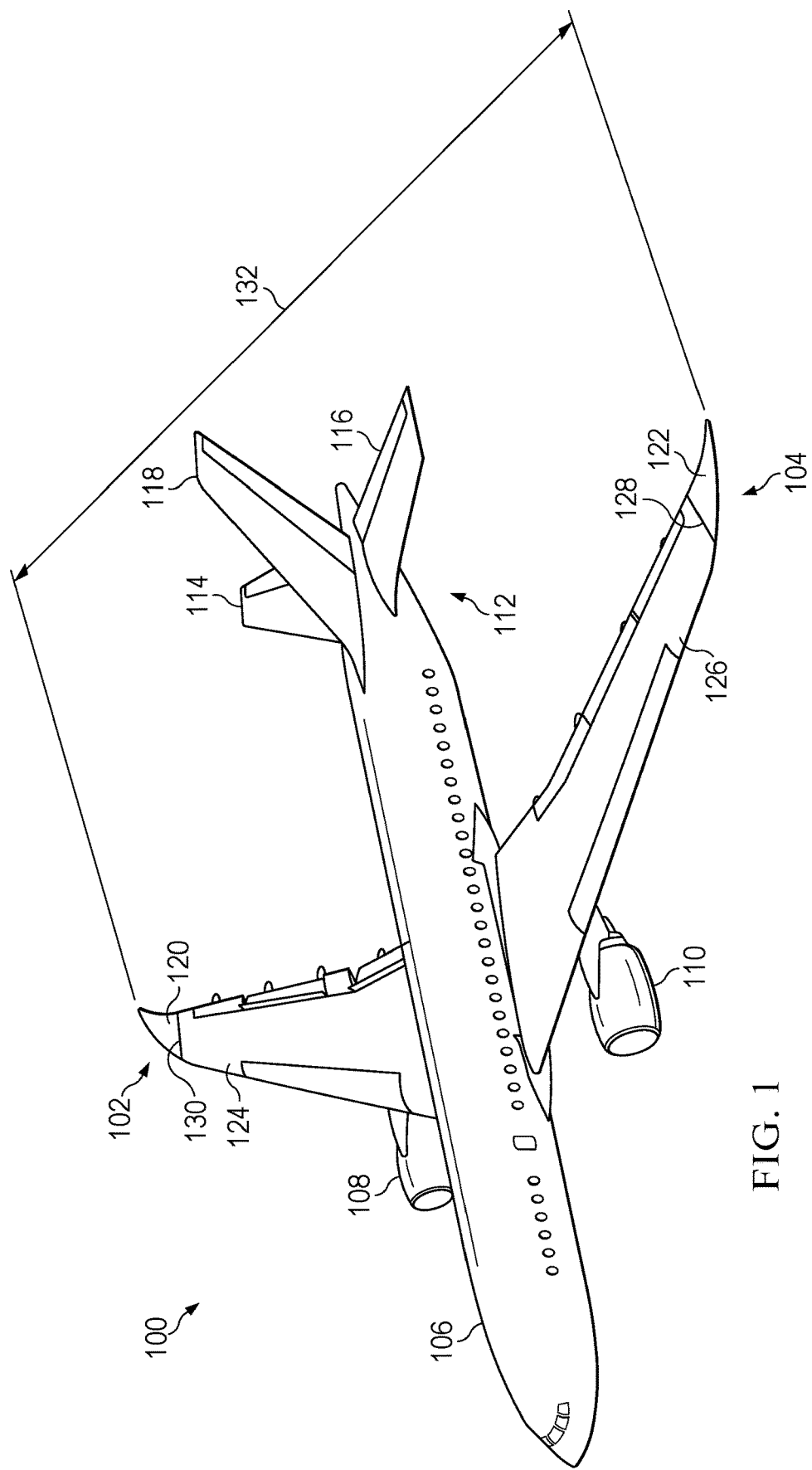
FIG. 1 is a diagram of an aircraft embodying a wing fold system in a flight position in accordance with an illustrative embodiment.
Figure 2:
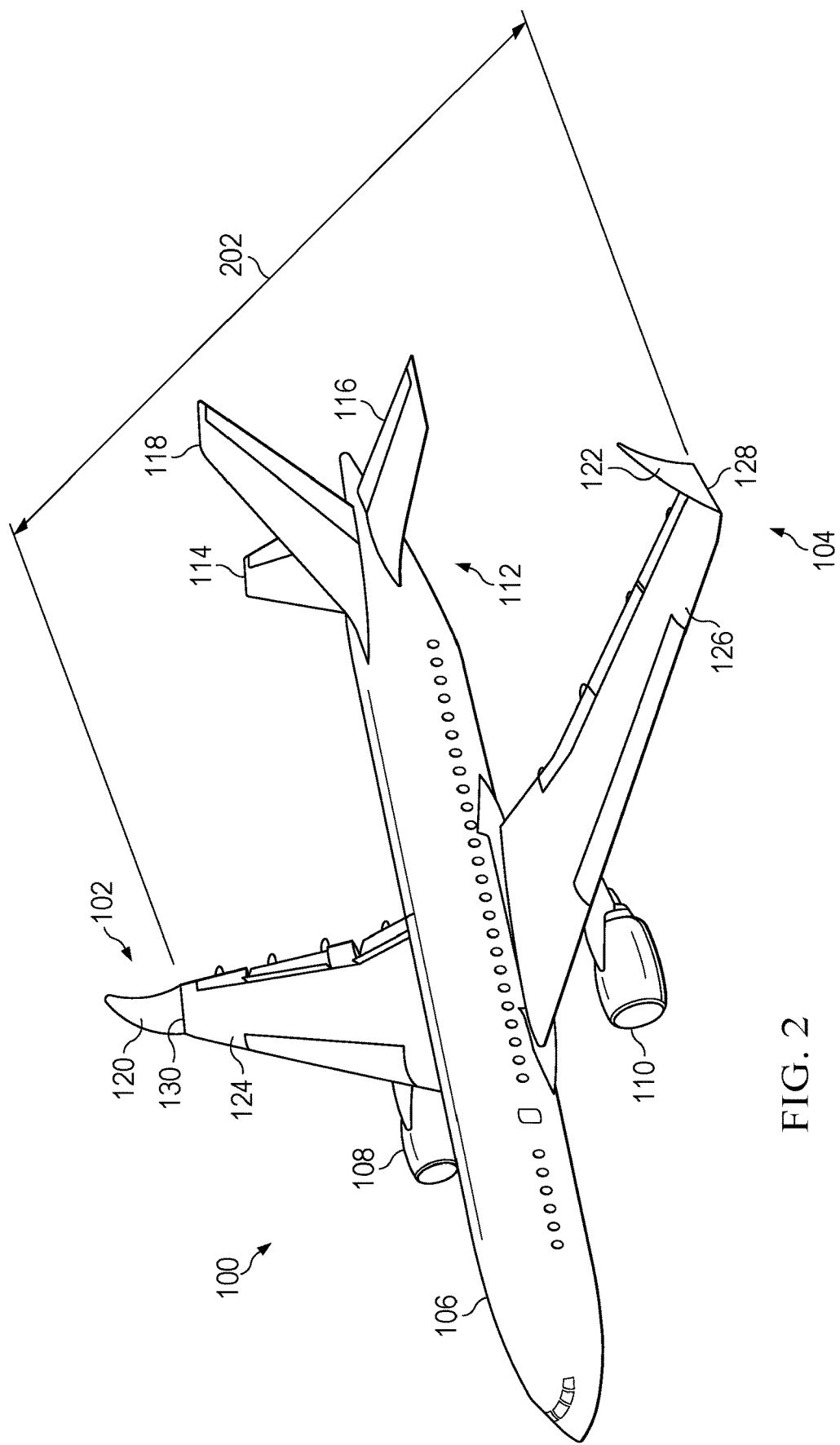
FIG. 2 is a diagram of an aircraft embodying a wing fold system in a folded position in accordance with an illustrative embodiment.

Unless otherwise noted and where appropriate, similarly named features and elements of illustrative embodiments of one figure of the disclosure correspond to and embody similarly named features and elements of embodiments of the other figures of the disclosure. With reference now to the figures, and in particular, with reference to FIGS. 1 and 2, an illustration of an aircraft is depicted in accordance with an illustrative embodiment. Aircraft 100 may be an example of an aircraft in which a wing fold system may be implemented in accordance with an illustrative embodiment. In this illustrative example, aircraft 100 may include wing 102 and wing 104 attached to body 106; engine 108 attached to wing 102; and engine 110 attached to wing 104. FIG. 1 depicts wing 102 and wing 104 of aircraft 100 in flight position and FIG. 2 depicts wing 102 and wing 104 of aircraft 100 in folded position.

Wing 102 may include a fixed portion 124 and an unfixed portion 120. Fixed portion 124 may be an inboard portion of the wing fixed to body 106. Similarly, wing 104 may include a fixed portion 126 and an unfixed portion 122. Wing 102 may include wing fold system 130 that may move unfixed portion 120 with respect to fixed portion 124.

More broadly, unfixed portion 122 and/or unfixed portion 120 may be referred to as a second structure. More broadly, fixed portion 126 and/or fixed portion 124 may be referred to as a first structure. In alternate embodiments, unfixed portion 122 and/or unfixed portion 120 may be referred to as a first structure. More broadly, fixed portion 126 and/or fixed portion 124 may be referred to as a first structure.

Similarly, wing 104 may include wing fold system 128 that may move unfixed portion 122 with respect to fixed portion 126. In other words, without limitation, for a wing such as wing 104, second structure may be unfixed portion 122, a rotatable portion of wing 104. FIG. 1 shows wing fold system 128 and 130 of aircraft 100 in a flight position, with wingspan 132 such that aircraft 100 may be ready for flight.

FIG. 2 shows wingspan 202, reduced from wingspan 132, of aircraft 100 in folded position for operation on ground at an airport.

Body 106 may connect to tail section 112. Horizontal stabilizer 114, horizontal stabilizer 116, and vertical stabilizer 118 may be attached to tail section 112 of body 106.

Figure 3:
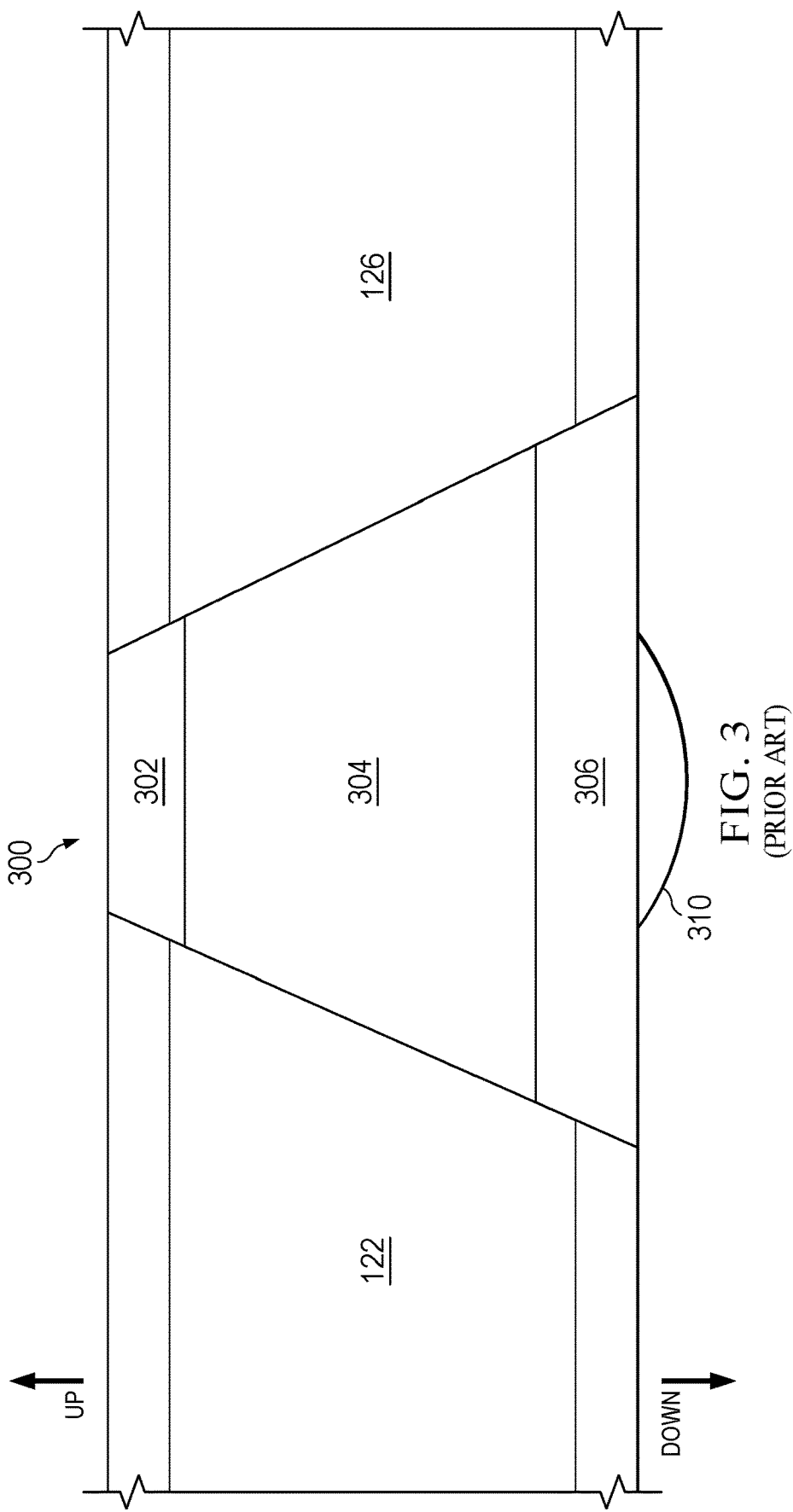
FIG. 3 is a side view diagram of a wing fold system in a flight position in accordance with an illustrative embodiment.

With reference to FIG. 3, FIG. 3 is a side view diagram of a wing fold system in a flight position in accordance with an illustrative embodiment. Wing fold system 300 may be a representation of wing fold system 128 or wing fold system 130 used by aircraft 100 of FIGS. 1 and 2. More specifically, FIG. 3 depicts a side view diagram of wing fold system 300 in flight position as depicted in FIG. 1.

Without limitation, FIG. 3 may represent a zoom in on wing fold system 300 of a section of wing 104 looking from the tail section 112 forward, of a physical embodiment of fixed portion 126 (or inversely, 124 looking back toward the tail section 112) and unfixed portion 122 (or inversely, 120 looking backward toward tail section 112) of FIGS. 1 and 2. Unfixed portion 122 may include a wingtip and may rotate about a first joint with respect to fixed portion 126. Unfixed portion 122 may be considered a first structure. The first structure may be rigid.

Fixed portion 126 may be considered a first structure. The first structure may be rigid. Fixed portion 126 may include a wing box. Wing fold system 300 may connect to a wing box in fixed portion 126.

Figure 4:
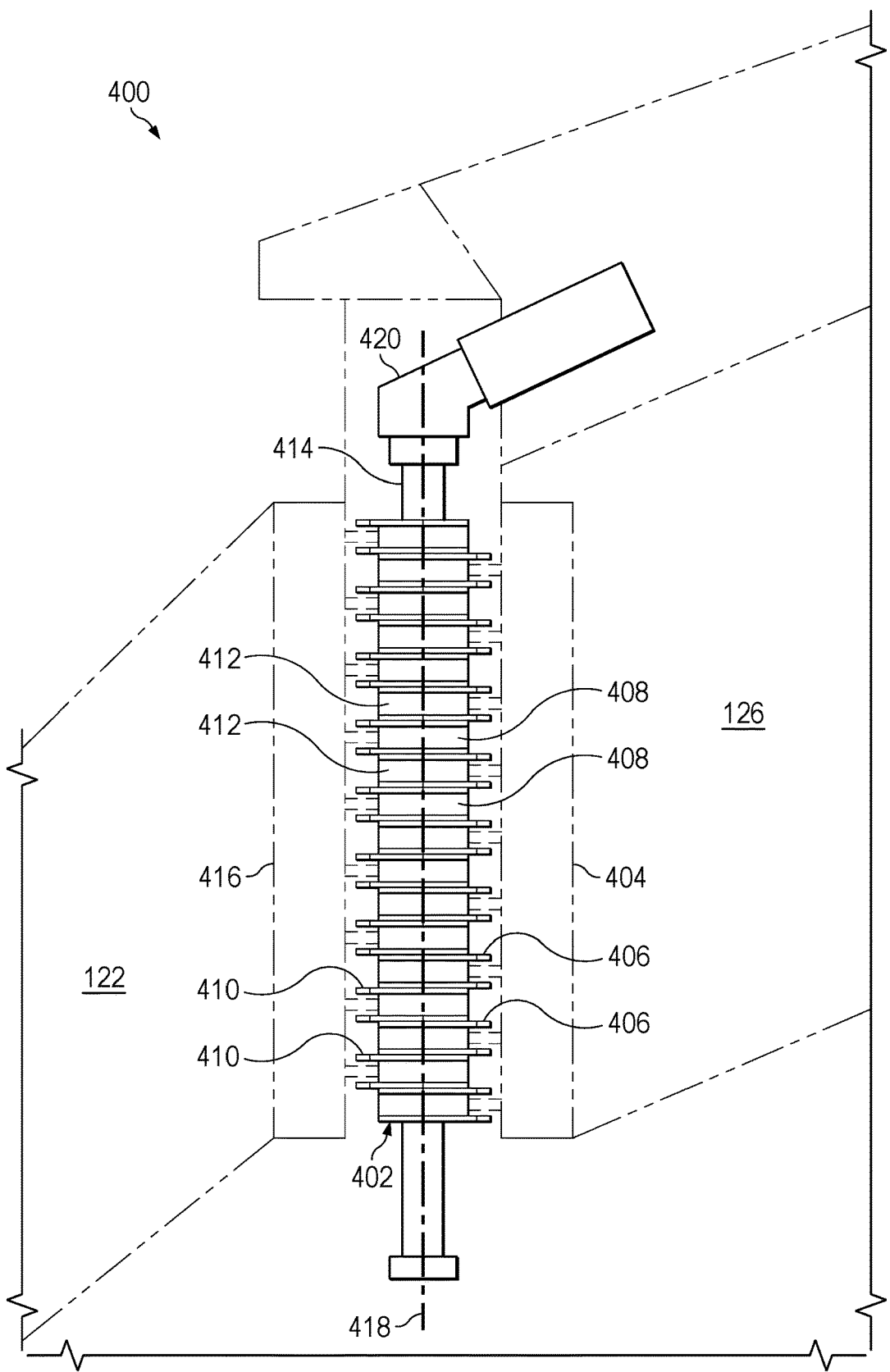
FIG. 4 is a perspective view of a prior art rotary gear actuator configured to rotate a second structure relative to a first structure in accordance with an illustrative embodiment.
Figure 5:
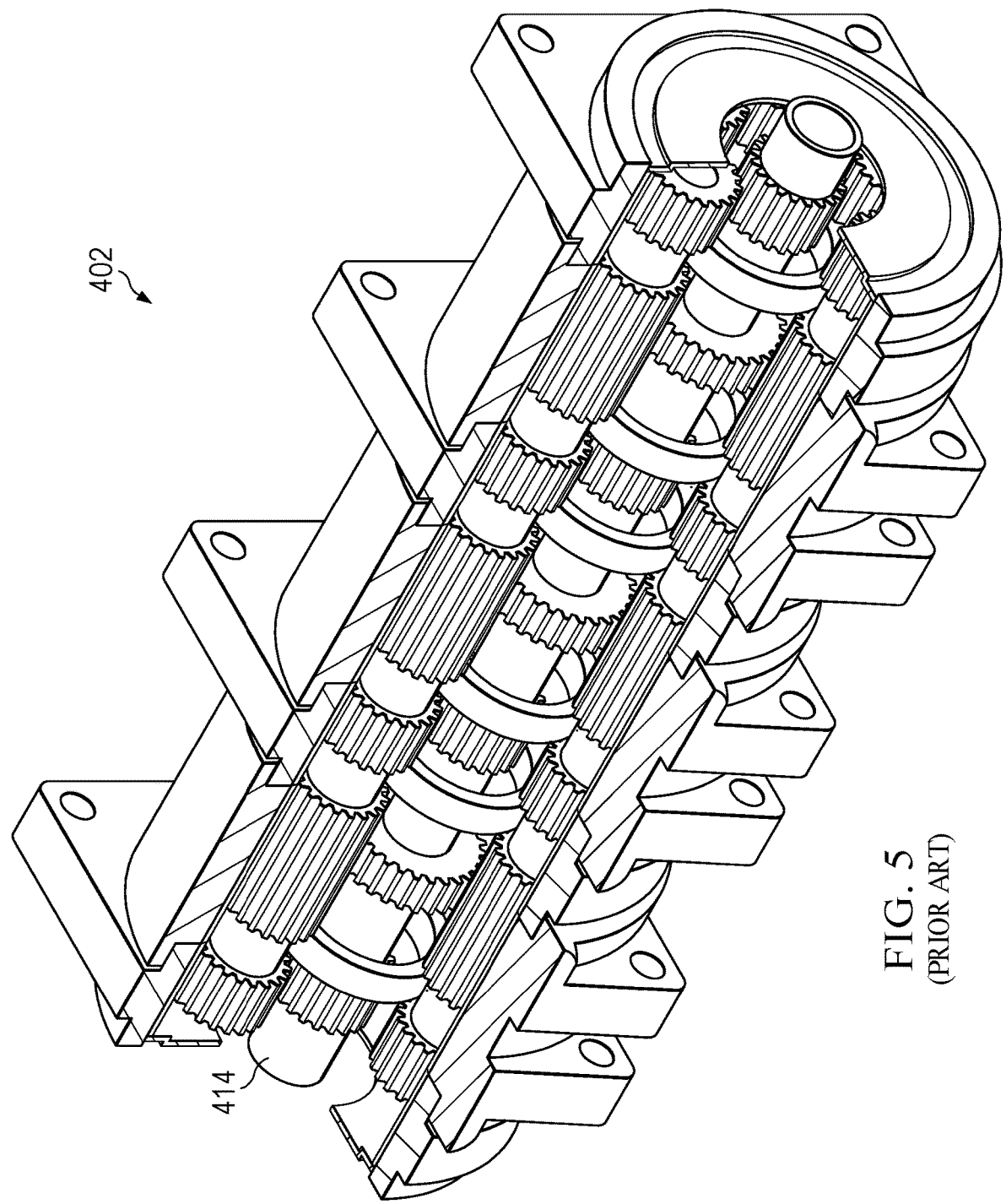
FIG. 5 is a perspective zoomed in view of a prior art rotary gear actuator configured to rotate a second structure relative to a first structure in accordance with an illustrative embodiment.

Wing 104 shown in FIG. 1 may include at least fairing 302, 304, and/or 306, fixed portion 126, unfixed portion 122. Fairing 302, 304, and/or 306 may house a mechanism for rotating unfixed portion 122 relative to fixed portion 126. Currently existing mechanisms for rotating unfixed portion 122 relative to fixed portion 126 may be, without limitation, as described by U.S. Pat. No. 5,518,466 or U.S. Pat. No. 9,415,857. Fairing 302, 304, and/or 306 may cover wing fold system 300 when wing fold system 300 is in flight position as depicted in FIGS. 1, and 3-4. Any of fairing 302, 304, and/or 306 may reduce the drag that would be caused by wing fold system 300 if it were exposed to air flowing across wing 104. Fairing 302, 304, and/or 306 may move in response to wing fold system 300 transitioning between a flight position as depicted in FIGS. 1, 4, and 5 and a folded position as shown in FIG. 2.

On current aircraft, fairing 306/318 may be formed with lower blister 310/420 which is located on the underside of wing 104. FIG. 3 with blister 310 may represent a view of a covering over a prior art rotary gear actuator configured to rotate a second structure relative to a first structure. As shown, blister 310/420 protrudes below an extended planar level from a bottom side of fixed portion 126, to accommodate mechanisms of typical current wing fold systems. The increase in drag and thus fuel consumption for aircraft 100 caused by lower blister 310 on fairing 306 underneath wing 104 is overcome and eliminated by embodiments described herein for the novel machine and process for rotating unfixed portion 122 that eliminate a need for blister 310. The novel machine and process for rotating unfixed portion 122 may also provide the technical benefit of reducing a weight of aircraft 100 as compared to typical current wing fold systems.

FIG. 4 is a perspective view of a prior art rotary gear actuator configured to rotate a second structure relative to a first structure. More specifically, FIG. 4 shows rotation system 400 configured to rotate unfixed portion 122 relative to fixed portion 126 of wing 104 as shown in FIGS. 1-3.

Rotary gear actuator 402 is shown mounted onto fixed portion 126 of wing 104 as shown in FIGS. 1-3. More specifically, rotary gear actuator 402 is shown connected to wing box 404 of fixed portion 126 of wing 104 by attachment lugs 406 integrated onto fixed ring gears 408.

Similarly, rotary gear actuator 402 is shown with attachment lugs 410 integrated into movable output ring gears 412 connected to tip box 416 in unfixed portion 122 of wing 104. Output ring gears 412 are connected to control the rotation of unfixed portion 122 of wing 104. Common to current rotation system 400 designs, as shown without limitation in FIG. 4, rotary gear actuator 402 is formed with alternating movable output ring gears 412 and fixed ring gears 408 mounted along drive shaft 414 along nearly an entire length of drive shaft 414.

Without limitation, drive shaft 414 may be a torque tube. Without limitation, drive shaft 414 may be aligned with and/or form hinge line 418 for wing 104. Drive shaft 414 may be driven by gearbox assembly 420.

Without limitation, rotary gear actuator 402 may be configured to comply with United States Department of Transportation Federal Aviation Administration Regulations that may require components of rotary gear actuator 402 to be able to withstand a certification tension force, and to be able to withstand a certification compressive force, that can support a maximum certified positive "g" load force on aircraft 100 while wing 104 produces a lift force required for a maximum certified takeoff weight multiplied by a safety factor, without a structural failure of any component of rotary gear actuator 402. Without limitation, maximum certified positive "g" forces may be 2.5. Without limitation, the safety factor may be 1.5.

Additionally, and without limitation, requirements may be promulgated for latching rotating portions of a wing that are similar to United States Department of Transportation Federal Aviation Administration Regulation requirements of § 25.783, "Fuselage doors," and other applicable sections of Title 14, Code of Federal Regulations (CFR), part 25. for doors and hatches on an aircraft fuselage as detailed at least by United States Department of Transportation Federal Aviation Administration Advisory Circular 25.783-1A, dated Apr. 25, 2005. Part 25 contains the airworthiness standards applicable to transport category airplanes.

Section 25.783 provides a definition for a latch and a lock on an aircraft system and requires the latching system to be designed so that it is inherently or specifically restrained from being back-driven from the latches. Section 25.783 details that latches are designed to eliminate, as much as possible, all forces from the latch side that would tend to unlatch the latches. In addition to these features that prevent the latches from inadvertently opening, a separate locking system is required.

When wing 104 is in flight position shown in FIGS. 1, 8, 11A-12C, 14, and 16, gravity and negative aerodynamic lift forces on unfixed portion 122 may create a force that may act in an opposite direction to normal lift forces in flight. Thus, some components in rotary gear actuator 402 may experience compressive forces, while other components in rotary gear actuator 402 may experience tension forces. Hence, components of rotary gear actuator 402 may be configured to comply with Federal Aviation Regulations that may require components of rotary gear actuator 402 to be able to withstand a certification compressive and/or tension force that can support a maximum certified negative "g" load force on the wing 104 and/or aircraft 100 in flight times a safety factor. Without limitation, maximum certified negative "g" forces may be 1.0. Without limitation, the safety factor may be 1.5.

Although FIGS. 1-16 use a folding wing as an example, one of ordinary skill in the art recognizes that rotation system 400 may more generally represent a second structure that may be other than an unfixed portion of a wing being rotated relative to a first structure other than fixed portion of a wing. Further, in an alternate embodiment addressed below, attachments may be reversed such that the second structure may be the unfixed portion of the wing and the first structure may be the fixed portion of the wing.

FIG. 5 is a perspective zoomed in view of a prior art rotary gear actuator configured to rotate a second structure relative to a first structure. Without limitation, FIG. 5 illustrates one example from of what current gearing of rotary gear actuator 402 may look like in prior art patents, such as without limitation U.S. Pat. No. 5,518,466. One of ordinary skill in the art recognizes that FIG. 5 illustrates just one type of current actuator to rotate a structure relative to an adjacent structure. Without limitation, rotary gear actuator could also be a linear actuator such as described by U.S. Pat. No. 9,415,857 or other actuator configured to rotate a structure relative to an adjacent structure such as without limitation, U.S. Pat. No. 9,469,392 or U.S. Pat. No. 10,370,083.

With reference to FIGS. 6 through 19, illustrations of rotalliever 600 for a wing fold system are depicted in accordance with an illustrative embodiment. Rotalliever 600 and its associated wing fold system may be used by aircraft 100 of FIGS. 1 and 2.

Figure 6:
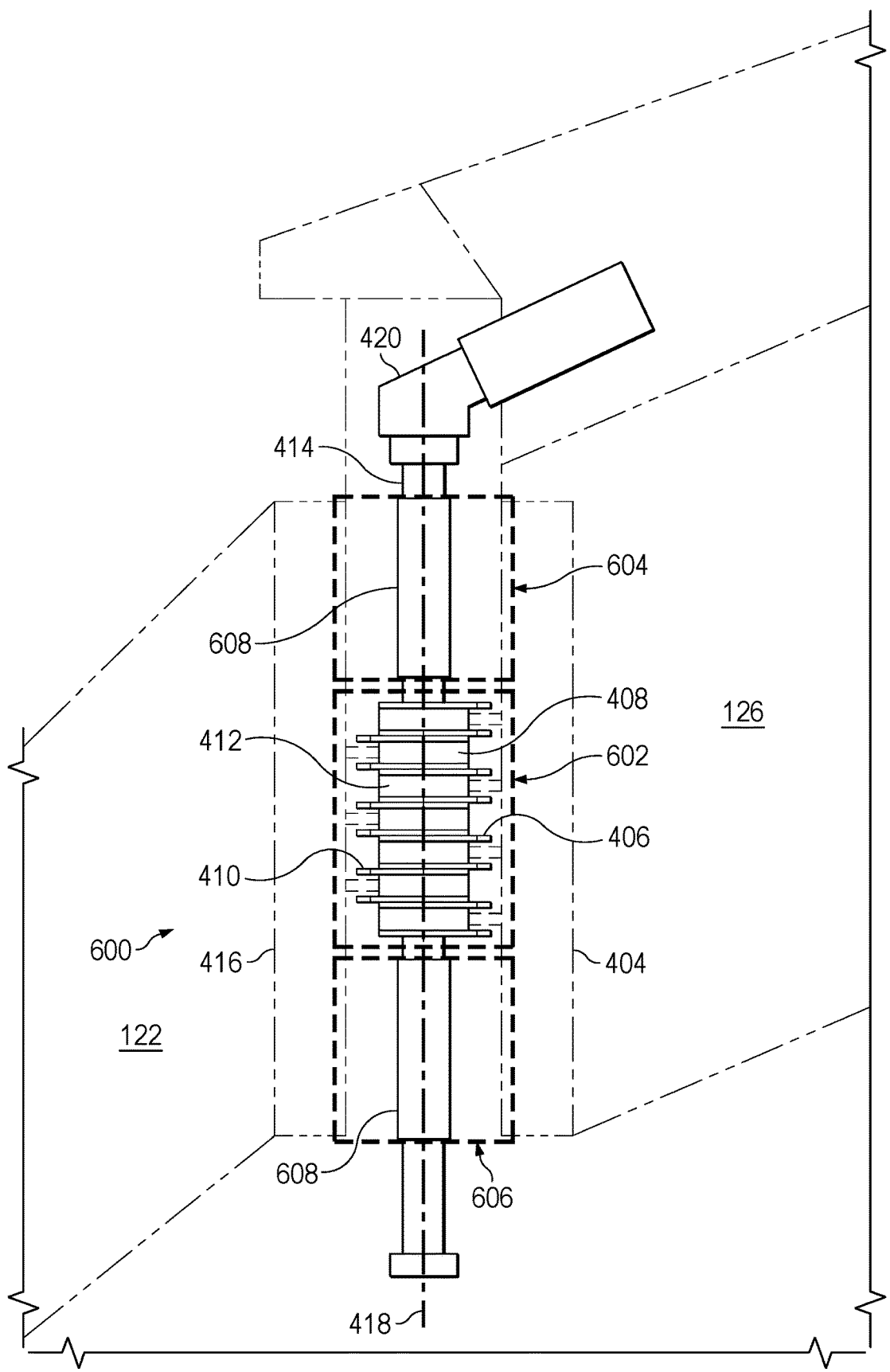
FIG. 6 is a perspective view of a novel rotation system configured to rotate a second structure relative to a first structure in accordance with an illustrative embodiment.

With reference now to FIG. 6, FIG. 6 is a perspective view of a novel rotation system configured to rotate a second structure relative to a first structure in accordance with an illustrative embodiment. More specifically, FIG. 6 shows novel rotalliever 600 that differs from current rotation systems, such as without limitation, rotation system 400 of FIG. 4 at least by having alternating movable output ring gears 412 and fixed ring gears 408 (or other similar geared rotary actuator or other rotating mechanism) mounted along only a rotation actuator 602 of drive shaft 414 instead of along nearly an entire length of drive shaft 414. As shown herein, drive shaft 414 may be within cylinder 608 until engaging with rotation actuator 602. Cylinder 608 may be a hollow cylinder. Cylinder 608, when hollow, may encircle and retain an element, such as without limitation, drive shaft 414. In an alternate embodiment further discussed below, cylinder 608 may be an empty cylinder or may be a solid rod.

As used herein, "rotalliever" is a new term for a particular novel machine or manufacture as described and embodied herein in at least FIG. 6 through FIG. 16. As mentioned above, although rotation actuator 602 is shown herein as potentially a rotary actuator such as without limitation, illustrated by rotary gear actuator 402 shown in FIG. 4 and/or FIG. 5. Rotation actuator 602 may be any device or process configured to rotate a first structure relative to a second structure such as without limitation, one of ordinary skill in the art recognizes that FIG. 5 illustrates just one type of current actuator to rotate a structure relative to an adjacent structure. Without limitation, rotary gear actuator could also be a linear actuator such as described by U.S. Pat. No. 9,415,857 or other actuator configured to rotate a structure relative to an adjacent structure such as without limitation, U.S. Pat. No. 9,469,392 or U.S. Pat. No. 10,370,083.

Rotalliever 600 with or without rotation actuator 602 directly incorporated as shown in FIG. 6 may be called and acts as a hinge that allows a second structure to rotate relative to a first structure, such as without limitation, unfixed portion 122 rotating relative to fixed portion 126. Accordingly, rotalatch 604 alone or as part of rotalliever 600 may also be called and considered a hinge that allows a second structure to rotate relative to a first structure, such as without limitation, unfixed portion 122 rotating relative to fixed portion 126.

Without limitation, Federal Aviation Regulations that may require components of rotary gear actuator 402 to be able to withstand a certification tension force, and to be able to withstand a certification compressive force, that can support a maximum certified positive "g" load force on wing 104 and/or aircraft 100 while wing 104 produces a lift force required for a maximum certified takeoff weight multiplied by a safety factor, without a structural failure of any component of rotary gear actuator 402. Without limitation, maximum certified positive "g" forces may be 2.5. Without limitation, the safety factor may be 1.5.

One of ordinary skill in the art recognizes that for machines and or processed that lack novel rotalatch 604 and/or rotalatch 606 of rotalliever 600, that like rotary gear actuator 402 of current rotation systems, rotation actuator 602 alone would have to carry all the loads mentioned above. However, the novel rotalliever 600 design that incorporates novel rotalatch 604 and/or rotalatch 606 alleviates rotation actuator 602 from having to carry loads generated by unfixed portion whenever novel rotalatch 604 and/or rotalatch 606 are in a latched position as described herein.

One of ordinary skill in the art recognizes that loads on a hinged wing in a flight, (such as without limitation wing 104 in FIG. 1) and thus on a rotary gear actuator such as without limitation, rotary gear actuator 402 of current rotation systems and/or possibly rotation actuator 602 (if it were mounted without novel rotalatch 604 and/or rotalatch 606 of rotalliever 600) may be as much as ten times greater than loads on rotary gear actuator 402 of current rotation systems and/or a rotation actuator 602 when the wing is operating on the ground (which may be in folded position such as shown by FIG. 2, a flight position flight such as shown in FIG. 1, or transitioning therebetween). Thus, one of ordinary skill in the art recognizes that when those ten times greater loads are transferred on to rotary gear actuator 402 of current rotation systems and/or a rotation actuator 602 that lacks a machine and/or process provided by novel rotalatch 604 and/or rotalatch 606 of rotalliever 600 for a hinged wing in flight, those components have to be designed and built to be ten times as strong and resilient as if only ground loads were carried on rotary gear actuator 402 of current rotation systems and/or a rotation actuator 602 that lacks a machine and/or process provided by novel rotalatch 604 and/or rotalatch 606 of rotalliever 600.

Thus, one of ordinary skill in the art recognizes that because unfixed portion 122 is only designed to be operationally rotated with aircraft 100 on the ground and because the novel machine and process described herein for novel rotalatch 604 and/or rotalatch 606 of rotalliever 600 alleviate loads upon rotation actuator 602 by having those loads carried instead by novel rotalatch 604 and/or rotalatch 606 of rotalliever 600 when novel rotalatch 604 and/or rotalatch 606 of rotalliever 600 are in a latched position, that a required strength and resilience (and thus a size, weight, of a rotation system for a hinged wing as compared to current systems that lack rotalliever 600 with rotalatch 604 and/or rotalatch 606) of rotation actuator 602 need only be required to carry a ten times or lesser ground load. Hence, one of ordinary skill in the art recognizes that rotalliever 600 with rotalatch 604 and/or rotalatch 606 produce the technological improvement of reducing a required strength and resilience and thus a size, weight, required of a rotation system for a hinged wing as compared to current systems that lack rotalliever 600 with rotalatch 604 and/or rotalatch 606.

When wing 104 is in flight position shown in FIGS. 1, 8, 11A-12C, 14, and 16, gravity and negative aerodynamic lift forces on unfixed portion 122 may create a force that may act in an opposite direction to normal lift forces in flight. Thus, some components in rotalliever 600, rotation actuator 602, and/or rotalatch 604 may experience compressive forces, while other components in rotalliever 600, rotation actuator 602, and/or rotalatch 604 may experience tension forces. Hence, components of rotalliever 600, rotation actuator 602, and/or rotalatch 604 may be configured to comply with Federal Aviation Regulations that may require components of rotalliever 600, rotation actuator 602, and/or rotalatch 604 to be able to withstand a certification compressive and/or tension force that can support a maximum certified negative "g" load force on the wing 104 and/or aircraft 100 in flight times a safety factor. Without limitation, maximum certified negative "g" forces may be 1.0. Without limitation, the safety factor may be 1.5.

As shown in FIG. 6, for a novel rotalliever 600, two-thirds of a traditional rotary gear actuator 402 are replaced by two sections of the novel rotalatch 604 configuration. As used herein, "rotalatch" is a new term for a particular novel configuration of components forming a machine or manufacture as described and embodied herein in at least FIGS. 6-16 of rotalliever 600. Without limitation, rotalliever 600 and/or rotalatch 604, may be configured to comply with Federal Aviation Regulations that may require components of rotary gear actuator 402 to be able to withstand a certification tension force, and to be able to withstand a certification compressive force, that can support a maximum certified positive "g" load force on aircraft 100 while wing 104 produces a lift force required for a maximum certified takeoff weight multiplied by a safety factor, without a structural failure of any component of rotary gear actuator 402. Without limitation, maximum certified positive "g" forces may be 2.5. Without limitation, the safety factor may be 1.5.

As will be shown in detail below, rotalatch 604 is configured to take on loads from unfixed portion when wing 104 is in flight position as shown in FIGS. 1, 8, 11A-12C, 14, and 16, as well as in folded position as shown in FIGS. 2, 7, and 9A-10C. Typically, loads on/from unfixed portion 122 in flight position as shown in FIGS. 1, 8, 11A-12C, 14, and 16, may be ten times greater than loads on/from fixed portion 126 in ground operations.

Currently, the geared teeth in alternating movable output ring gears 412 and fixed ring gears 408 (or other similar geared rotary actuator or other rotating mechanism) in a rotation system 400 of FIG. 4 must carry all loads from unfixed portion 122 when wing 104 is in flight position as shown in FIGS. 1, 8, 11A-12C, 14, and 16, as well as in folded position as shown in FIGS. 2, 7, and 9A-10C. Hence, with the novel machine and process that utilizes the novel rotalatch 604, alternating movable output ring gears 412 and fixed ring gears 408 (or other similar geared rotary actuator or other rotating mechanism) mounted along only a rotation actuator 602 of drive shaft 414 need only be sized to carry loads on unfixed portion 122 expected during operation on the ground, to include during rotation from a flight position as shown in FIGS. 1, 8, 11A-12C, 14, and 16 to a folded position as shown in FIGS. 2, 7, and 9A-10C.

Thus, the technological improvement of novel rotalliever 600 incorporating novel rotalatch 604 allows for rotation actuator 602 to reduce a required number, power, size, and weight for alternating movable output ring gears 412 and fixed ring gears 408 (or other similar geared rotary actuator or other rotating mechanism) as compared to existing rotary gear actuator systems such as without limitation, rotation system 400. Likewise, when applied to aircraft 100, novel machine rotalliever 600 incorporating novel rotalatch 604 reduces or eliminates a need for blister 310. Thereby, the technological improvement of novel machine rotalliever 600 incorporating novel rotalatch 604 produces a reduced drag and weight of aircraft 100 that improves performance characteristics of aircraft 100 including at least a fuel efficiency of aircraft 100.

In other words, as further described below, rotalliever 600 provides the technological improvement of a machine and process for selectively engaging a means of alleviating selected components of a rotation system from having to carry a load. Thus, without limitation, for aircraft 100 novel rotalliever 600 reduces a required strength, size, and weight of a rotation system to just those only required to actually rotate unfixed portion 122 and carry other loads expected only during ground operations.

One of ordinary skill in the art recognizes that while FIG. 6 shows rotalatch 604 and rotalatch 606, that occupy two-thirds of drive shaft 414, that depending upon characteristics of a specific unfixed portion 122 to be rotated, and expected loads thereon, that proportion of drive shaft 414 retaining rotalatch 604 and rotalatch 606 may be more or less than two-thirds. One of ordinary skill in the art recognizes that while FIG. 6 shows rotalatch 604 and rotalatch 606, that depending upon characteristics of a specific unfixed portion 122 that only rotalatch 604 may be used, or more than rotalatch 604 and rotalatch 606 may be mounted along drive shaft 414. In other words, a number of and proportional length of rotalatch 604 and rotation actuator 602 may be tailored for desired performance characteristics for rotalliever 600 and aircraft 100. Performance characteristics for rotalliever 600 may include without limitation a specified power, rotation rate, size, weight, strength, stress, strain, reliability, service life, accessibility, materials, and/or other characteristics.

In FIG. 6 through FIG. 19, any item introduced and labeled retains that label as that item is reshown in FIG. 6 through FIG. 19. Although FIG. 6 shows rotation actuator 602 mounted on cylinder 608 and driven by drive shaft 414, one of ordinary skill in the art recognizes that in an alternate embodiment (not shown) rotation of unfixed portion 122 relative to fixed portion 126 might also be driven by an actuator that is not mounted on cylinder 608. In such an embodiment, rotalliever 600 without rotation actuator 602 may still serve as a hinge with a latch that allows for rotation of unfixed portion 122 relative to fixed portion 126 about central axis 702 of cylinder 608 and fixing unfixed portion 122 in a desired angular position of rotation relative to fixed portion 126 by latching and locking of rotalatch 604 and hence connected unfixed portion 122 in the desired angular position. Thus, in an alternative embodiment, rotalliever 600 that lacks rotation actuator 602 connected to cylinder 608 acts effectively as hinge for rotation about cylinder 608 and central axis 702 thereof that does not drive, but does control rotation and fixing of a first structure relative to a second structure. In other words, whereas rotalliever 600 that incorporates rotation actuator 602 may be considered a machine, rotalliever 600 that is used with a separate actuator not connected to cylinder 608, may be considered a manufactured tool, a latching hinge that locks.

Figure 7:
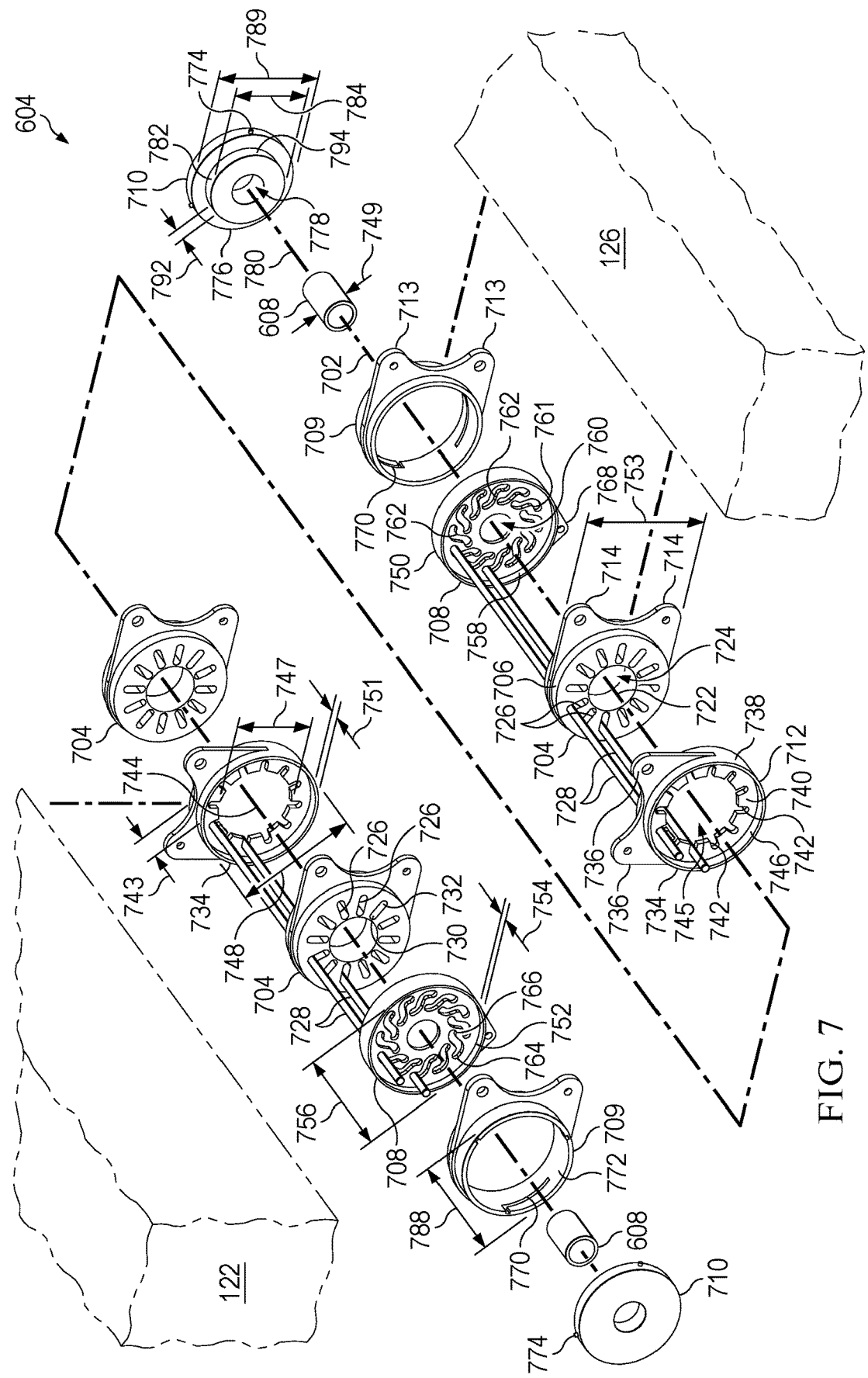
FIG. 7 is an expanded perspective view of a latch for a rotation system in accordance with an illustrative embodiment.

With reference to FIG. 7, FIG. 7 is an expanded perspective view of a latch for a rotation system in accordance with an illustrative embodiment. More specifically, FIG. 7 shows an expanded view of rotalatch 604 introduced in FIG. 6.

Descriptions for the embodiment shown in FIG. 7 of rotalatch 604 may be considered equally applicable to rotalatch 606 and any subsequent plurality. For brevity, descriptions herein for rotalatch 604 may be equally applied to rotalatch 606. Rotalatch 604 provides a novel technological solution for alleviating loads on a rotation system of a structure that rotates relative to another structure, such as without limitation, unfixed portion 122 of wing 104.

Rotalatch 604 may be formed around cylinder 608. Cylinder 608 may house drive shaft 414 (shown in FIG. 4) that drives rotation of rotation actuator 602 for rotalliever 600. Cylinder 608 may be a cylinder. Cylinder 608 may have a central axis 702. Rotalatch 604 may be mounted around cylinder 608 and may include at least: one stationary member 704, one movable member 734, one driving member 708, one support-ring 709, and one lock-plate 710.

FIG. 7 shows, respectively, more than: one stationary member 704, one movable member 734, one driving member 708, one support-ring 709, and one lock-plate 710. For clarity due to limited space available in the Figure, complete labeling of each of the items directly above is divided among their identical items in FIG. 7. Components labeled on any one of those numbered items, although not shown labeled on every representation of the similarly numbered item, may be considered as present on every representation of the similarly numbered item. In other words, as a non-limiting example, when one of stationary member 704 is labeled with slots 726, similarly shown elements on each stationary member 704—although not labeled—are understood to also be slots 726. The number of slots 726 in each stationary member 704 may be equal to or greater than the number of pins 728, wherein a width of each slot in the number of slots 726 is identical to each other.

Stationary member 704 may have: a set of fixed-lugs 714 that extend radially outward from exterior surface 706 of stationary member 704, central axis 722 of rotalliever 600 stationary member 704, and central opening 724 of stationary member 704.

Without limitation, fixed-lugs 714 may be configured to secure stationary member 704 to a first structure, such as without limitation, fixed portion 126 of wing 104. Stationary member 704 may be secured to fixed portion 126 with fixed-lugs 714 such that stationary member 704 does not rotate relative to fixed portion 126.

As shown in FIG. 7, more than one stationary member 704 may be mounted onto cylinder 608. Central opening 724 is sized to surround cylinder 608. Stationary member 704 may contact and be fitted and/or secured onto cylinder 608. Stationary member 704 may comprise at least as many slots 726 as there are pins 728. One of ordinary skill in the art recognizes that the number of slots 726 selected, and their radial spacing, determines the degrees of rotation at which unfixed portion 122 may be stopped and latched into a fixed state by rotalatch 604.

Slots 726 may be oblong-shaped. Each slot in slots 726 may be oriented with length 716, respectively, that aligns with a radial from central axis 722 toward exterior surface 706 of stationary member 704. The oblong shape of each slot in slots 726 may be sized to retain a pin in pins 728 such that a respective pin in pins 728 may move from unlatched position 730 of respective slot in slots 726 to latched position 732 of respective slot in slots 726. Each slot of slots 726 may retain one pin of pins 728. A size of every pin of pins 728 may be identical to a size of every other pin of pins 728. A diameter of every pin of pins 728 may be identical to a diameter of every other pin of pins 728. A diameter of every pin of pins 728 is less than a width of each of the oblong-shaped slots 726. In other words, each pin of pins 728 may fit into any notch in notches 742. Each pin in pins 728 is elongated to extend to be long enough to simultaneously engage with every lock-plate 710, support-ring 709, driving member 708, stationary member 704, and movable member present in rotalatch 604. Rotalatch 604 may be configured without every slot of slots 726 retaining a pin of pins 728.

When rotalliever 600 has more than one rotalatch 604 (such as shown in FIG. 6 with rotalatch 606), in some embodiments, each pin in pins 728 may extend through both rotalatch 604 and rotalatch 606. In other embodiments, rotalatch 604 and rotalatch 606 may have their own distinct pins 728.

As shown in FIGS. 7-16, slots 726 may be radially spaced around stationary member 704 such that an angular separation between radials of stationary member 704 bisecting any two adjacent slots of slots 726 around central axis 722 is constant for all slots 726. In other words, stationary member 704 may have at least as many oblong-shaped slots 726 that extend radially away from central opening 724 as there are pins 728. Slots 726 may be equally spaced around central opening 724 as shown in FIGS. 7-16 herein. In alternate embodiments, spacing of slots 726 may not be equal, but may be as desired for fixed positions desired when rotating unfixed portion 122 and commensurate with spacing of notches 742 in stationary member 734. Hence, without limitation, stationary member 704 may include twelve slots 726 spaced radially 30 degrees apart from each other radially around stationary member 704.

However, one of ordinary skill in the art recognizes that dependent upon desired operational angular rotation requirements and/or loading conditions and desired load distribution, a number and an angular spacing between radials of stationary member 704 bisecting any two adjacent slots of slots 726 around central axis 722 may vary (not shown) between slots 726. A number and radial angular spacing of notches 742 on movable member 734 and of curved slots 762 on driving member 708 may also vary to be commensurate with varied spacing of slots 726 on stationary member 704. A number of curved slots 762 on driving member 708 may also vary to be commensurate with varied spacing of slots 726 on stationary member 704. Number of notches 742, number of curved slots 762, and number of slots 726 each must be at least as great as the number of pins 728.

Movable member 734 may include at least: central axis 744, central opening 745, perimeter-collar 712, interior-extension 740 that extends inward from perimeter-collar 712 toward central axis 744 of movable member 734, latch-lugs 736 extended from exterior side 738 of movable member 734, and notches 742. Latch-lugs 736 may be configured to secure movable member 734 to a structure that rotates, such as without limitation, unfixed portion 122 of wing 104. Interior-extension 740 of movable member 734 include a number of notches 742 equal or greater in number to a number of slots 726 in stationary member 704.

Each notch of notches 742 is sized to receive and retain one pin at a time of pins 728. A depth of each notch of notches 742 is at least as great as a diameter of each pin in pins 728. Thus, interior-extension 740 extends inward from perimeter-collar 712 toward central axis 744 of movable member 734 a distance equal or greater than a diameter of each pin in pins 728.

However, movable member 734 also has central opening 745 whose diameter 747 is greater than diameter 749 of cylinder 608 plus twice a diameter of a pin in pins 728. In other words, central opening 745 allows pins 728 to be moved within movable member 734 from one notch in notches 742 to another notch in notches 742. Hence, movable member 734 may be mounted surrounding cylinder 608.

Thus, pins 728 in latched position 732 in slots 726 (as shown in FIGS. 7-8, 9A-9C, and 11A-11C) may act as load carrying latch-pins that are tailored to receive, carry, and/or resist loads from unfixed portion 122 trying to rotate away from a current position. In current rotational systems such as rotation system 400, those loads are not carried by pins 728, but act completely upon rotary gear actuator 402 and attachment lugs 410 and movable output ring gears 412 thereof. In other words, when pins 728 are engaged within notches 742 of movable member 734, movable member 734 and thus unfixed portion 122 are prevented from rotating.

Thus, by having pins 728 when secured within notches 742 of movable member 734 in latched position 732 in slots 726 (shown at least in FIGS. 7-8, 9A-9C, and 11A-11C), the novel technical improvement of rotalliever 600 prevents attachment lugs 410 and movable output ring gears 412 within rotation actuator 602 of rotalliever 600 from having to receive, carry, and/or resist loads from unfixed portion 122 trying to rotate away from a current position. Hence, at least a strength, a weight, and/or a size of attachment lugs 410 and movable output ring gears 412 within rotation actuator 602 of rotalliever 600 may be reduced as compared to similar components of currently common rotary actuator 402 in rotation system 400.

Accordingly, in other embodiments that use a linear actuator such as described by U.S. Pat. No. 9,415,857 or other actuator configured to rotate a structure relative to an adjacent structure such as without limitation, U.S. Pat. No. 9,469,392 or U.S. Pat. No. 10,370,083, rotalatch 604 may carry the flight loads that are much larger than the ground loads on wing 104 and thus on rotalliever 600. Therefore, the actuator portion, such at least without limitation rotation actuator 602, may be designed and sized to only overcome and/or carry ground loads to fix or rotate unfixed portion 122. Hence rotalatch 604 in rotalliever 600 provides the technological advantage over current wing rotations systems of allowing a much less powerful, smaller, and/or lighter actuator portion than are currently used to rotate and/or fix a first structure relative to a second structure.

Notches 742 may be spaced radially around movable member 734 identically to spacing between each slot of slots 726 in stationary member 704. As further described below, in operation of rotalatch 604, pins 728 may be moved into and out of notches 742. As detailed below, when engaged in notches 742, pins 728 and notches 742 may carry loads that control a rotation of unfixed portion 122.

As detailed below, when engaged in notches 742, pins 728 carry loads that prevent a rotation of unfixed portion 122. Hence, a desired material and/or a dimension of each pin on pins 728 and each notch of notches 742 may be tailored based upon expected loads from a particular dimension, material, and/or operational environment and/or desired performance characteristics for unfixed portion 122. Likewise, a desired material and/or a dimension of each interior-extension 740 of movable member 734 may be tailored for desired load distributions on movable member 734 and/or on rotalatch 604, and/or on rotalliever 600.

Although FIG. 7 shows a total of two identical movable member 734 and three stationary member 704, one of ordinary skill in the art understands that any number of one or more movable member 734 may be incorporated in rotalatch 604. Any number of one or more may be stationary member 704 incorporated in rotalatch 604. A spacing/location and/or number of movable member 734, stationary member 704, driving member 708, support-ring 709, and/or lock-plate 710 may be tailored to achieve a desired loading, respectively, on each pin of pins 728 and/or each notch of notches 742.

Likewise, one of ordinary skill in the art recognizes that a spacing/location and/or number of movable member 734, stationary member 704, driving member 708, support-ring 709, and/or lock-plate 710 may be tailored to achieve a desired loading, respectively, on each movable member 734, stationary member 704, driving member 708, support-ring 709, and/or lock-plate 710. Although FIG. 7 shows two lock-plate 710, with adjacent support-ring 709, at each end of rotalatch 604, one of ordinary skill in the art recognizes that in an alternate embodiment (not shown) rotalatch 604 could contain only one each of lock-plate 710, with adjacent support-ring 709, at only one end of rotalatch 604. One of ordinary skill in the art recognizes that in an alternate embodiment (not shown), rotalatch 604 could contain lock-plate 710 with adjacent support-ring 709 adjacent to each driving member 708.

In other words, as well, one of ordinary skill in the art recognizes that while the illustrations show a number of movable member 734 connected to unfixed portion 122 and a number of stationary member 704 attached to fixed portion 126, that based at least upon expected loads and/or operating procedures, that the illustrations may be inverted to show (although not shown in the Figures) a number of stationary member 704 connected to unfixed portion 122 and a number of movable member 734 connected to fixed portion 126.

One of ordinary skill in the art recognizes that as a number of pins 728, notches 742, movable member 734, stationary member 704, driving member 708, support-ring 709, and/or lock-plate 710 are increased, then for any given loading applied from unfixed portion 122, that a loading carried by each individual one of pins 728, notches 742, movable member 734, stationary member 704, driving member 708, support-ring 709, and/or lock-plate 710 are reduced. Thus, a material, dimension, weight, and/or strength of each individual unit of pins 728, notches 742, movable member 734, stationary member 704, driving member 708, support-ring 709, and/or lock-plate 710 may be changed and/or reduced as well. Thus, each rotalatch 604 as well as a total number of rotalatch 604 included in rotalliever 600 may be tailored to achieve specific characteristics desired each individual unit of pins 728, notches 742, movable member 734, stationary member 704, driving member 708, support-ring 709, and/or lock-plate 710, and/or rotalliever 600 overall. Movable member 734 perimeter-collar 712 may have width 743 that is greater than a thickness of stationary member 704. Inner wall 746 of perimeter-collar 712 has height 751. Diameter 748 across inner wall 746 of perimeter-collar 712 of movable member 734 may be sized to allow some portion of stationary member 704 to fit within and rotate within inner wall 746 of perimeter-collar 712. In other words, diameter 753 of stationary member 704 (excluding fixed-lugs 714) may be less than diameter 748 across inner wall 746 of perimeter-collar 712 of movable member 734. In other words, the radial positioning of the movable member 734 relative to stationary member 704 may be accomplished by perimeter-collar 712. Movable member 734 is not directly attached to 608 in order to allow pins 728 to transition from one notch to another notch in notches 742. One of ordinary skill in the art recognizes that although the figures show that exterior surface 706 of stationary member 704 sized to fit within perimeter-collar 712 of movable member 734, that an alternate embodiment may be used with some inverted interface geometries wherein stationary member 704 may have a new perimeter extension added that receives movable member 734 that may be formed with interior-extension 740 being extended out to width 743 of movable member 734 such that perimeter-collar 712 of movable member 734 is effectively replaced by a wider interior-extension 740 that may engage within the new added perimeter extension of stationary member 704.

Driving member 708 may have perimeter-collar 750. Inner wall 752 of perimeter-collar 750 of driving member 708 may have height 754. Diameter 756 across inner wall 752 of perimeter-collar 750 of driving member 708 may be sized to allow some portion of stationary member 704 to fit within and rotate within inner wall 752 of perimeter-collar 750 of driving member 708. In other words, diameter 753 of stationary member 704 (excluding fixed-lugs 714) may be less than diameter 756 across inner wall 752 of perimeter-collar 750 of driving member 708.

Driving member 708 may have internal-plate 761 that extends inward toward central axis 758 of driving member 708 but leaves a central opening 760 sized to surround and rotate around cylinder 608. Cylinder 608 may engage with central opening 760 of driving member 708 such that cylinder 608 holds driving member 708 central axis collocated with central axis 702 of cylinder 608 and driving member 708 may rotate around cylinder 608. Internal-plate 761 of driving member 708 may have a number of curved slots 762. The number of curved slots 762 may be equal to the number of slots 726.

A width respectively of each curved slot in curved slots 762 may retain a pin of pins 728. Each of curved slots 762 in internal-plate 761 of driving member 708 may be shaped to move a pin of pins 728 between latched position 764 near perimeter-collar 750 of driving member 708 and unlatched position 766 near central opening 760 of driving member 708.

In operation, rotation of driving member 708 around central axis 758 of driving member 708 moves a pin of pins 728 that extends through a curved slot of curved slots 762 and a slot of slots 726 between latched position 764 and unlatched position 766. Latched position 764 and unlatched position 766 may each be formed as detents configured to inhibit movement of a pin in pins 728 from moving toward or away from central axis 758 unless driving member 708 is rotated. In other words, curved slots 762 are referred to as curved because their entire length is not parallel to a radial of driving member 708 at least because of the offset of detents in each curved slot in curved slots 762 formed at latched position 764 and unlatched position 766.

Without limitation, curved slots 762 may be shaped and/or oriented as shown in FIG. 7 so that a clockwise rotation of driving member 708 moves a pin of pins 728 that extends through a curved slot of curved slots 762 and a slot of slots 726 from latched position 764 to unlatched position 766. Hence, a counter-clockwise rotation of driving member 708 would move a pin of pins 728 that extends through a curved slot of curved slots 762 and a slot of slots 726 from unlatched position 766 to latched position 764. Alternatively, curved slots 762 may be shaped and/or oriented (not shown) such that a clockwise rotation of driving member 708 moves a pin of pins 728 that extends through a curved slot of curved slots 762 and a slot of slots 726 from unlatched position 766 to latched position 764. Hence, with curved slots 762 in an alternative shape and/or orientation (not shown) a counter-clockwise rotation of driving member 708 would move a pin of pins 728 that extends through a curved slot of curved slots 762 and a slot of slots 726 from latched position 764 to unlatched position 766.

Clevis 768 may extend from perimeter-collar 750 of driving member 708. Clevis 768 may provide a connection point for a mechanism (not shown) configured to rotate driving member 708 independent of any motion of movable member 734. Clevis 768 may be configured to connect clevis 768 with a mechanism (not shown) that rotates driving member 708 about central axis 758 of driving member 708. Without limitation, mechanism may be a piston mounted (not shown) on fixed portion 126. Without limitation, when more than one driving member 708 are present in rotalatch 604, each clevis 768 may be connected to its own mechanism, or may be connected to each other clevis 768 on each other driving member 708 such that a single mechanism may rotate all clevis 7768 and their associated driving member 708. Without limitation, all clevis 768 may be connected to each other by a single shaft (not shown).

Pins 728 may be tailored to be of a size and material composition that allows them to move along a length of slots 726. A material composition and/or dimensions of pins 728 may be tailored to loads expected based upon characteristics of unfixed portion 122, fixed portion 126, and/or operational parameters thereof.

Support-ring 709 may have grooves 770 in inner-wall 772 and support-lugs 713. Each groove of Grooves 770 may be sized and shaped to receive a nub of nubs 774 from lock-plate 710. Each groove of grooves 770 may be sized and shaped to retain a nub of nubs 774 from lock-plate 710. Grooves 770 may be engraved within inner-wall 772 of support-ring 709 in a helical orientation. In other words, as will be further discussed with FIGS. 15A-16 below, translation of lock-plate 710 along central axis 780 and a length of cylinder 608 may be achieved by rotating lock-plate 710 when nubs 774 are within grooves 770 of support-ring 709.

Lock-plate 710 may include: central opening 778 centered around central axis 780 of lock-plate 710, nubs 774, and lock-disc 782. Nubs 774 may extend outwardly from exterior perimeter 776 of lock-plate 710. Nubs 774 of lock-plate 710 may be sized and shaped to engage in grooves 770 of support-ring 709. Lock-plate 710 and nubs 774 thereon may be moved into grooves 770 by lock-plate 710 being translated along cylinder 608. Nubs 774 may be moved deeper into grooves 770 by rotating lock-plate 710 around cylinder 608. Lock-plate 710 may be translated along and/or rotated around cylinder 608 by a lock-actuator (not shown in FIG. 7). Translation and/or rotation of lock-plate 710 may be aided by helical orientation of grooves 770 within support-ring 709.

Lock-disc 782 may have diameter 784 less than diameter 789 of lock-plate 710. Diameter 789 of lock-plate 710 may be less than diameter 788 across interior wall of support-ring 709. Hence, lock-plate 710 may slide within support-ring 709. As shown in greater detail in at least FIG. 15A, diameter 784 of lock-disc 782 of lock-plate 710 is sized to fit within and contact/restrain pins 728 when in pins 728 are in latched position 732 in stationary member 704. In other words, diameter 784 of lock-disc 782 is less than a distance between pins 728 in latched position 732 in slots 726 in stationary member 704.

Figure 8:
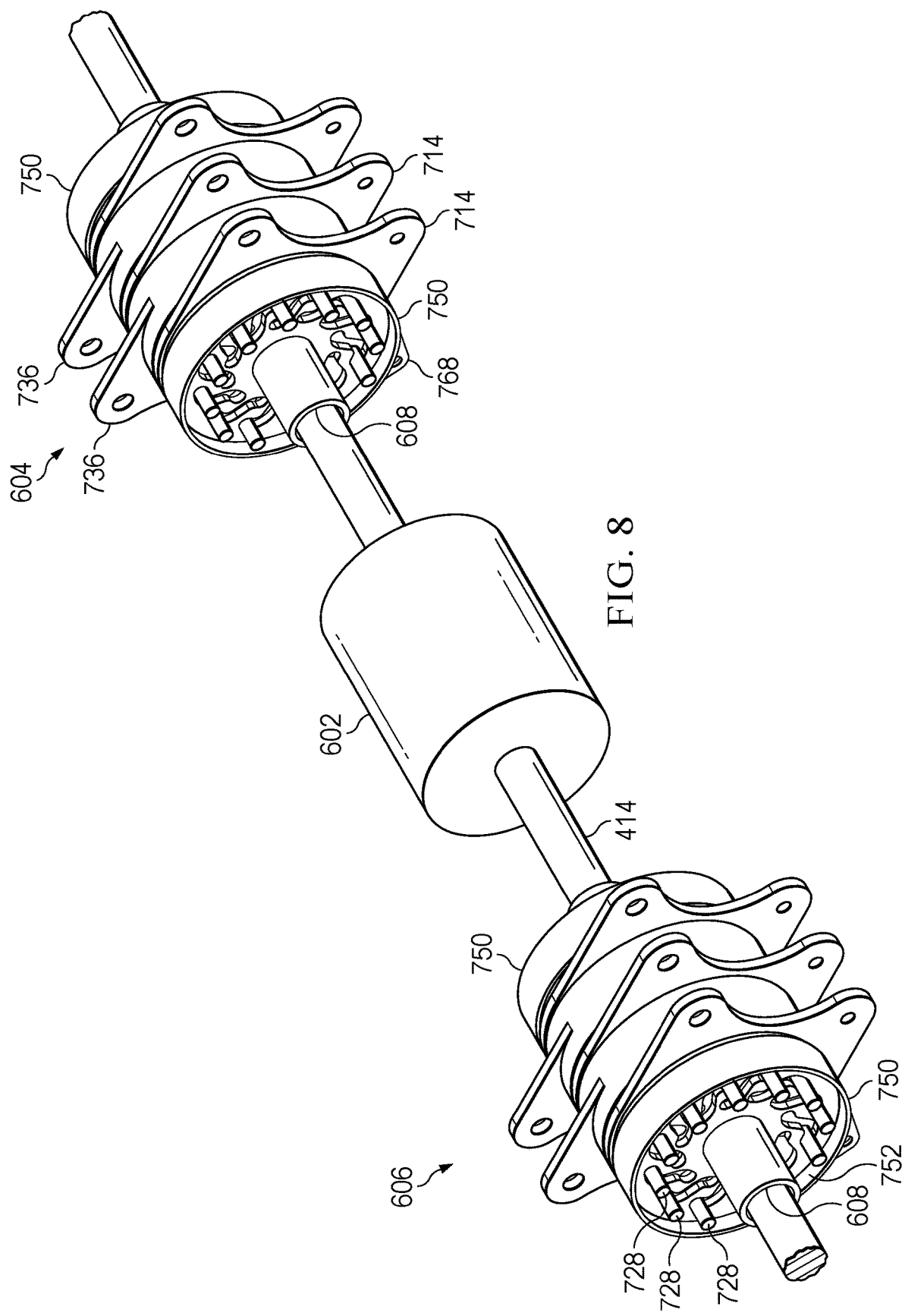
FIG. 8 is a perspective view of a rotation system configured to rotate second structure relative to a first structure in accordance with an illustrative embodiment.

With reference to FIG. 8, FIG. 8 is a perspective view of a rotary gear actuator configured to rotate a second structure relative to a first structure in accordance with an illustrative embodiment. More specifically, FIG. 6 shows novel rotalliever 600 that differs from current rotation systems (such as without limitation, rotation system 400 of FIG. 4) at least by having alternating movable output ring gears 412 and fixed ring gears 408 (or other similar geared rotary actuator or other rotating mechanism as shown in FIG. 4 and FIG. 5) mounted along only rotation actuator 602 on drive shaft 414 instead of along nearly an entire length of drive shaft 414. As mentioned above, rotalliever 600 may incorporate other mechanisms (not shown in this application) in place of rotation actuator 602 to drive actual rotation of unfixed portion 122 relative to fixed portion 126.

More specifically, FIG. 8 shows a non-limiting embodiment for rotalatch 604 and rotalatch 606 adjoining rotation actuator 602. Rotalatch 604 and rotalatch 606 are each shown with a non-limiting configuration of: one stationary member 704 bracketed on both sides by, respectively, one movable member 734, each of which is respectively bracketed by an additional stationary member 704, each of which is respectively bracketed by one driving member 708, and all surrounding cylinder 608. To aid viewing driving member 708, support-ring 709 and lock-plate 710 have been removed from rotalatch 604 as shown in FIG. 7.

FIG. 8, in contrast to FIG. 7, shows latch-lugs 736 for movable member 734 rotated to flight position for unfixed portion 122 as shown in FIG. 1. One of ordinary skill in the art recognizes that the embodiment of flight position as shown in FIG. 1 is not limiting for rotalatch 604; for applications where the second structure attached to latch-lugs 736 and the first structure attached to fixed-lugs 714 are not parts of a wing, the flight position embodiment described herein refers to fixed-lugs 714 and latch-lugs 736 extending away from cylinder 608 essentially 180 degrees from each other. Pins 728 are shown in latched position 764 of curved slots 762 in driving member 708. As will be shown later, pins 728 in latched position 764 of curved slot 762 in driving member 708 indicates that pins 728 are also in latched position 732 of slots 726 in stationary member 704 and also in notches 742 of stationary member 704 defines a latched position for rotalatch 604.

One of ordinary skill in the art recognizes that depending upon a size, a weight, and/or operational requirements for at least one of: unfixed portion 122, fixed portion 126, wing 104, and aircraft 100, that a number and/or placement for each of stationary member 704, movable member 734, and/or driving member 708 in rotalatch 604 may vary. One of ordinary skill in the art recognizes that depending upon a size, a weight, and/or operational requirements for at least one of: unfixed portion 122 and fixed portion 126, wing 104, and aircraft 100, that a number and/or placement for each of rotalatch 604 in rotalliever 600 may vary. As mentioned above, all references to unfixed portion 122, fixed portion 126, and wing 104 may be applied equally to unfixed portion 120, fixed portion 124, and wing 102.

Figure 9A:
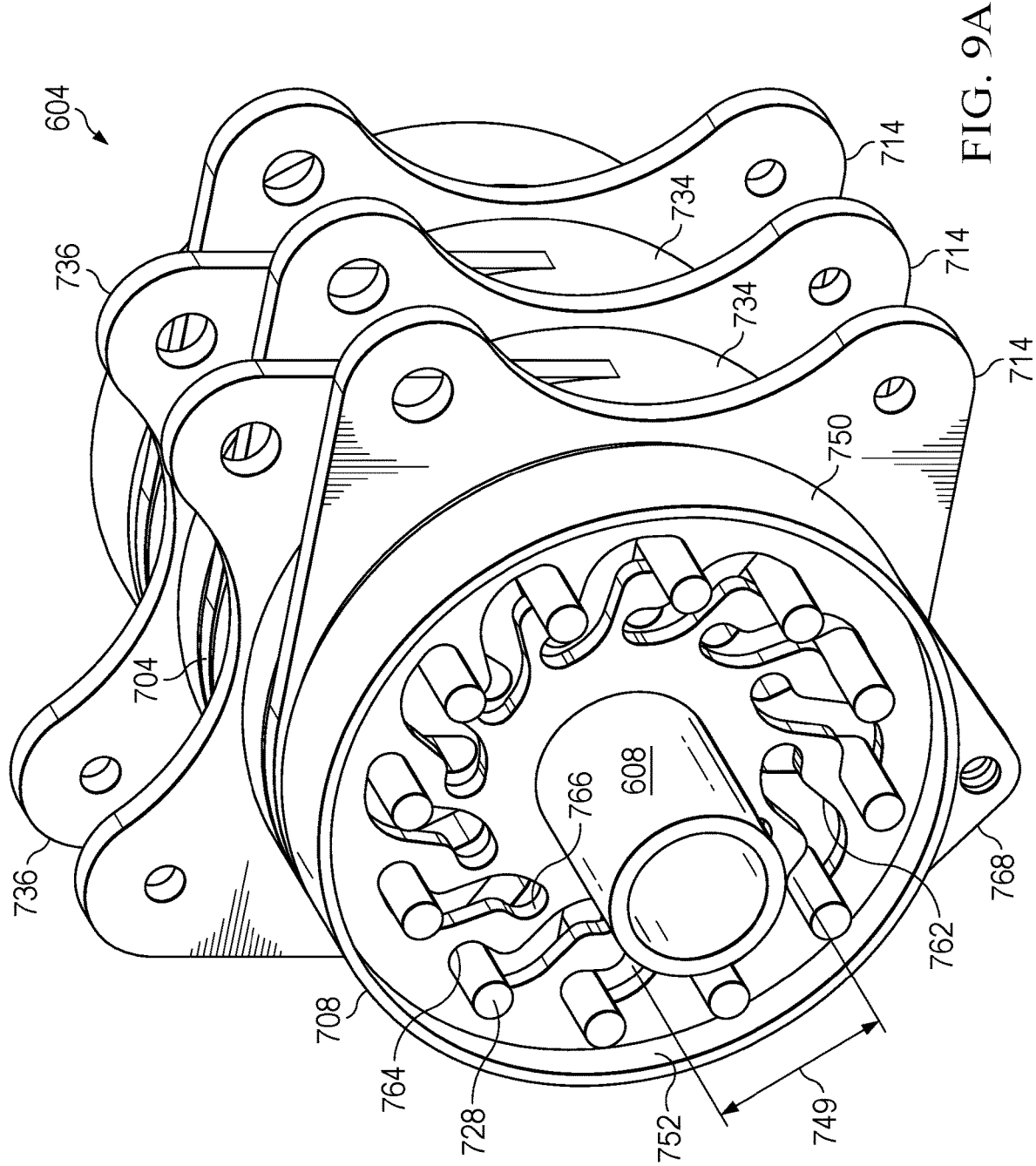
FIG. 9A is a perspective view of a portion of a rotalatch in a folded position and latched without a support-ring or a lock-disc in accordance with an illustrative embodiment.

With reference to FIG. 9A, FIG. 9A shows a perspective view of a portion of a rotalatch in a folded position and latched without a support-ring or a lock-plate in accordance with an illustrative embodiment. More specifically, FIG. 9A shows rotalatch 604 with movable member 734 rotated to a folded position for unfixed portion 122 as shown for wing 104 in FIG. 2. As with FIG. 8, support-ring 709 and lock-plate 710 have been removed from rotalatch 604 to enable better viewing of pins 728 in driving member 708.

As with FIG. 7, FIG. 9A shows latch-lugs 736 for movable member 734 rotated to folded position for unfixed portion 122 as shown in FIG. 2. One of ordinary skill in the art recognizes that the embodiment of folded position as shown in FIG. 2 is not limiting for rotalatch 604; for applications where the first structure attached to latch-lugs 736 and the second structure attached to fixed-lugs 714 are not parts of a wing, the flight position embodiment described herein refers to fixed-lugs 714 and latch-lugs 736 extending away from cylinder 608 at some value of less than 180 degrees from each other.

Each pin of pins 728 are shown, respectively, in latched position 764 of curved slots 762 in driving member 708. Pins 728 in latched position 764 of curved slots 762 in driving member 708 indicates that pins 728 are also in latched position 732 of slots 726 in stationary member 704 and also in notches 742 of stationary member 704, which defines a latched position for rotalatch 604.

Clevis 768 is shown extending from driving member 708. Clevis 768 may provide a connection point for a mechanism (not shown) configured to rotate driving member 708 independent of any motion of movable member 734. Clevis 768 may be configured to connect clevis 768 with a mechanism (not shown) that rotates driving member 708 about central axis 758 of driving member 708. Without limitation, a mechanism may be a piston mounted (not shown) on fixed portion 126. Without limitation, when more than one driving member 708 are present in rotalatch 604, each clevis 768 may be connected to its own mechanism, or may be connected to each other clevis 768 on each other driving member 708 such that a single mechanism may rotate all clevis 7768 and their associated driving member 708. Without limitation, all clevis 768 may be connected to each other by a single shaft (not shown).

In operation, after unfixed portion 122 was moved to folded position as shown for wing 104 by FIG. 2, unfixed portion 122 may be latched into folded position. To latch unfixed portion 122 into folded position, clevis 768 would be moved to rotate driving member 708 and thereby move pins 728 into latched position shown by FIG. 9A through FIG. 9B.

Figure 9B:
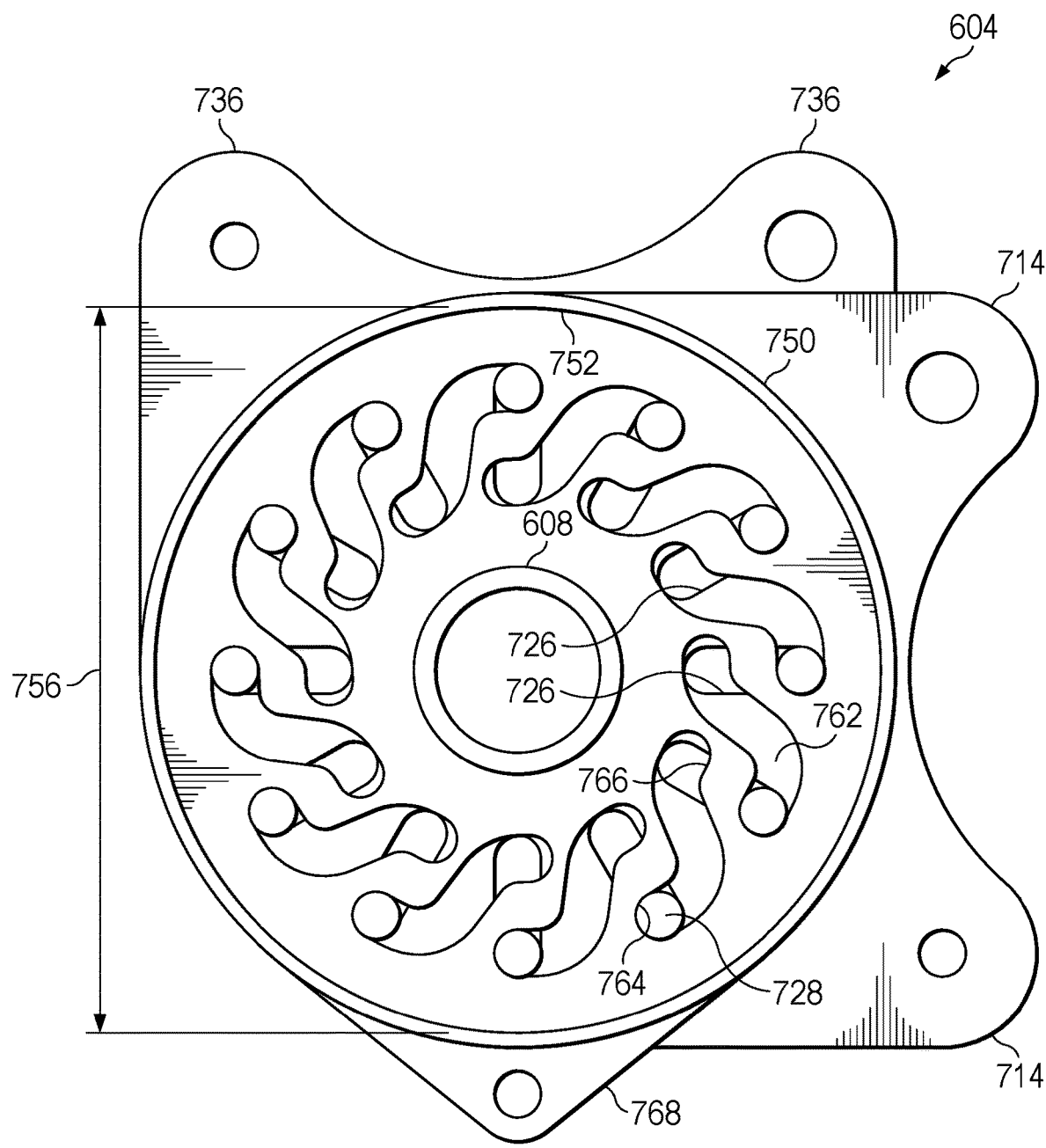
FIG. 9B is an end-on view of a portion of a rotalatch in a folded position and latched without a support-ring or a lock-disc in accordance with an illustrative embodiment.

With reference to FIG. 9B, FIG. 9B shows an end-on view of a portion of a rotalatch in a folded position and latched without a support-ring or a lock-plate in accordance with an illustrative embodiment. More specifically, FIG. 9B is an end-on view of the portion of rotalatch 604 shown in FIG. 9A. As with FIG. 9A, FIG. 9B shows latch-lugs 736 for movable member 734 rotated to folded position for unfixed portion 122 as shown in FIG. 2. Pins 728 are shown in latched position 764 of curved slots 762 in driving member 708. Pins 728 in latched position 764 of curved slot 762 in driving member 708 indicates that pins 728 are also in latched position 732 of slots 726 in stationary member 704 and also in in notches 742 of stationary member 704 defines a latched position for rotalatch 604.

Clevis 768 is shown extending from driving member 708. Clevis 768 may provide a connection point for a mechanism (not shown) configured to rotate driving member 708 independent of any motion of movable member 734. Clevis 768 may be configured to connect clevis 768 with a mechanism (not shown) that rotates driving member 708 about central axis 758 of driving member 708. Without limitation, a mechanism may be a piston mounted (not shown) on fixed portion 126. Without limitation, when more than one driving member 708 are present in rotalatch 604, each clevis 768 may be connected to its own mechanism, or may be connected to each other clevis 768 on each other driving member 708 such that a single mechanism may rotate all clevis 768 and their associated driving member 708. Without limitation, all clevis 768 may be connected to each other by a single shaft (not shown).

Figure 9C:
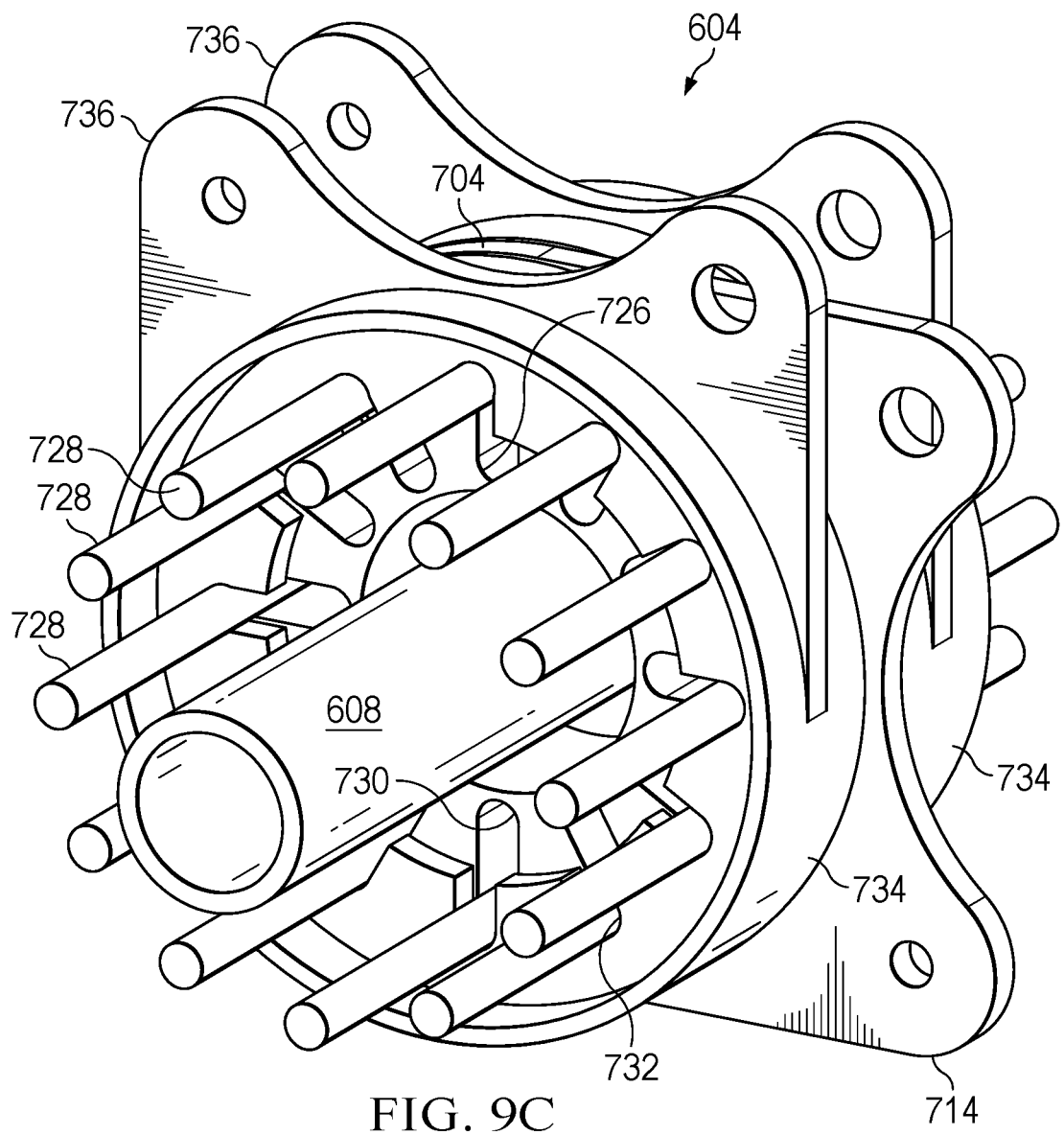
FIG. 9C is a perspective view of a portion of a rotalatch in a folded position and latched without a lock-disc, support-ring, or a driving member in accordance with an illustrative embodiment.

With reference to FIG. 9C, FIG. 9C shows a perspective view of a portion of a rotalatch in a folded position and latched without a lock-plate, support-ring, or a driving member in accordance with an illustrative embodiment. More specifically, FIG. 9C shows side view of rotalatch 604 from FIGS. 9A and 9B, but with driving member 708 removed to provide a clearer view of location of pins 728 in notches 742 of movable member 734 when rotated to the folded position for unfixed portion 122 as shown for wing 104 in FIG. 2.

While each of twelve notches 742 shown in FIG. 9C is filled with a single pin of twelve pins 728, one of ordinary skill in the art recognizes that in some embodiments, not all notches 742 may be filled by one of pins 728, and that number of notches 742 may be other than 12 so long as it is at least equal or greater than the number of pins 728. FIG. 9C shows rotalatch 604 in a latched condition because all of pins 728 are respectively in latched position 732 in slots 726.

Figure 10A:
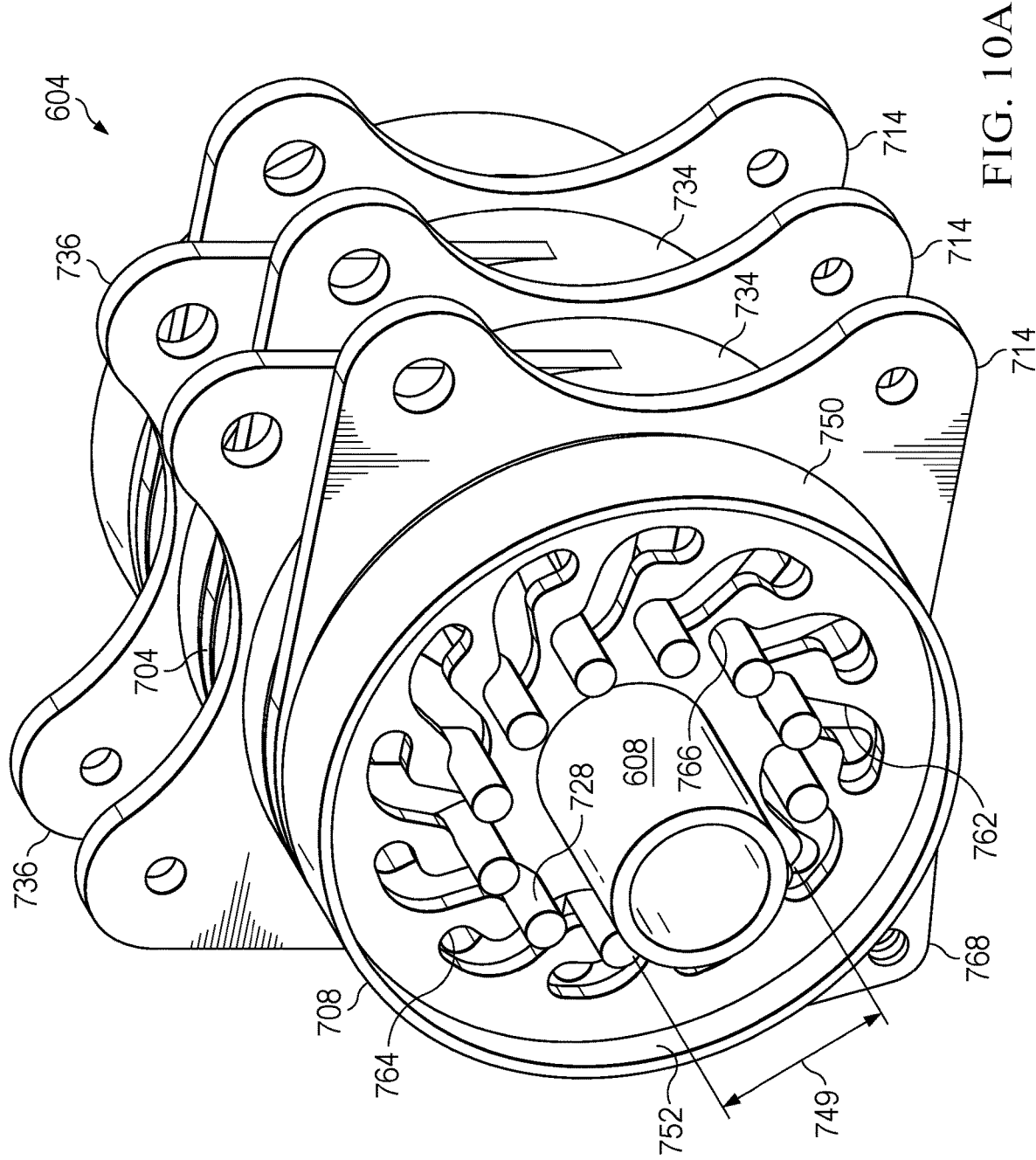
FIG. 10A is a perspective view of a portion of a rotalatch in a folded position and unlatched without support-ring or a lock-disc in accordance with an illustrative embodiment.

With reference to FIG. 10A, FIG. 10A is a perspective view of a portion of a rotalatch in a folded position and unlatched without support-ring or a lock-plate in accordance with an illustrative embodiment. More specifically, FIG. 10A shows rotalatch 604 with movable member 734 rotated to a folded position for unfixed portion 122 as shown for wing 104 in FIG. 2. As with FIG. 8 and FIG. 9A, support-ring 709 and lock-plate 710 have been removed from rotalatch 604 to enable better viewing of pins 728 in driving member 708.

In operation, when it is desired to move unfixed portion 122 out of folded position as shown for wing 104 by FIG. 2, pins 728 must be moved to unlatched position 766 in curved slots 762 of driving member 708 and unlatched position 730 in slots 726 of stationary member 704. To unlatch pins 728, clevis 768 would be moved to rotate driving member 708 and thereby move pins 728 into unlatched position 766 shown by FIG. 10A and FIG. 10B.

While each of twelve curved slots 762 shown in FIG. 10A is filled with a single pin of twelve pins 728, one of ordinary skill in the art recognizes that in some embodiments, not all curved slots 762 may be filled by one of pins 728, and that number of pins 728 may be other than twelve. Number of pins 728 may be based upon a desired load distribution and/or amount of rotation. Desired load distribution may be for pins 728 and or other components of rotalliever 600.

Figure 10B:
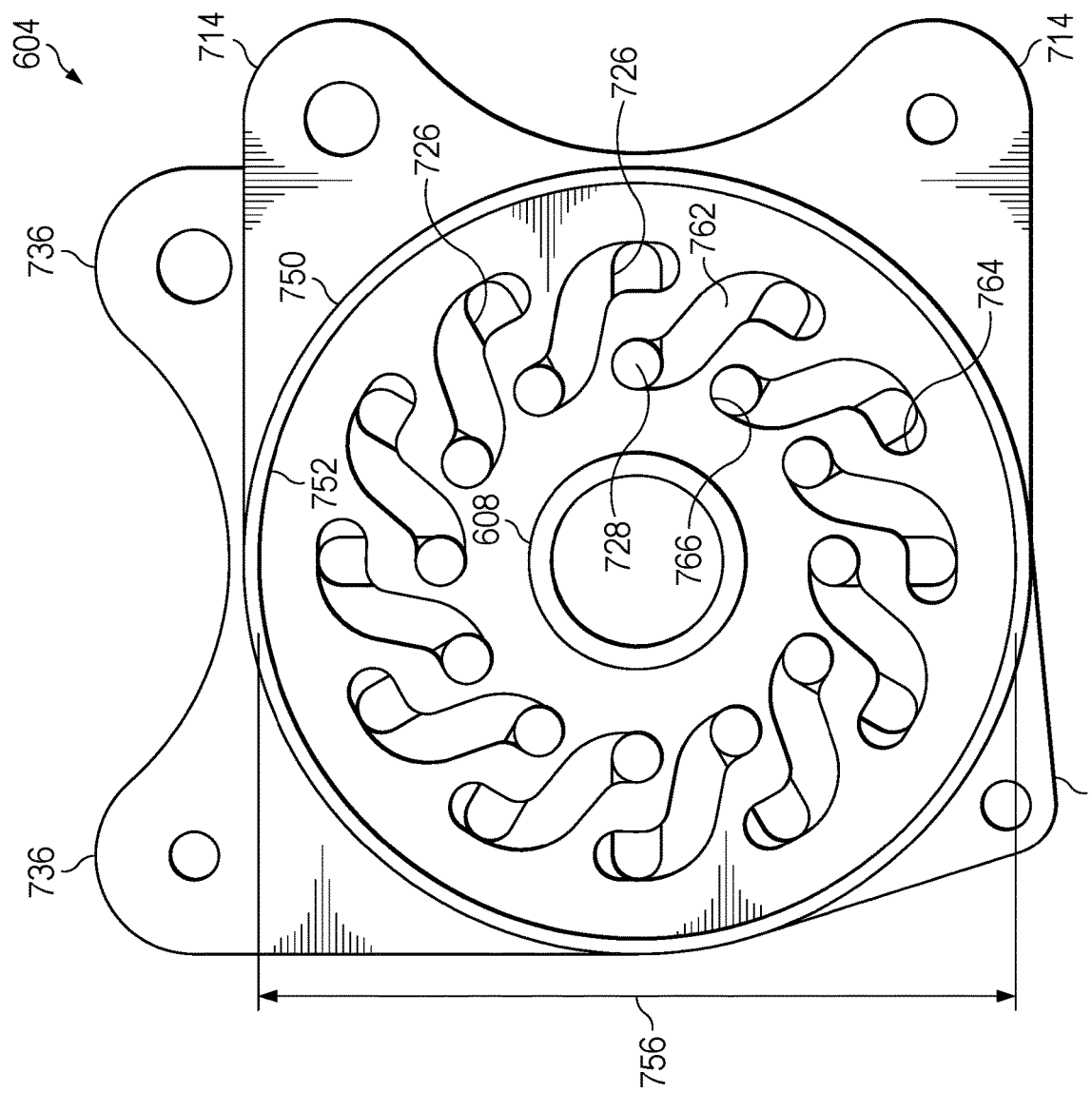
FIG. 10B is an end-on view of a portion of a rotalatch in a folded position and unlatched without a support-ring or a lock-disc in accordance with an illustrative embodiment.
Figure 10C:
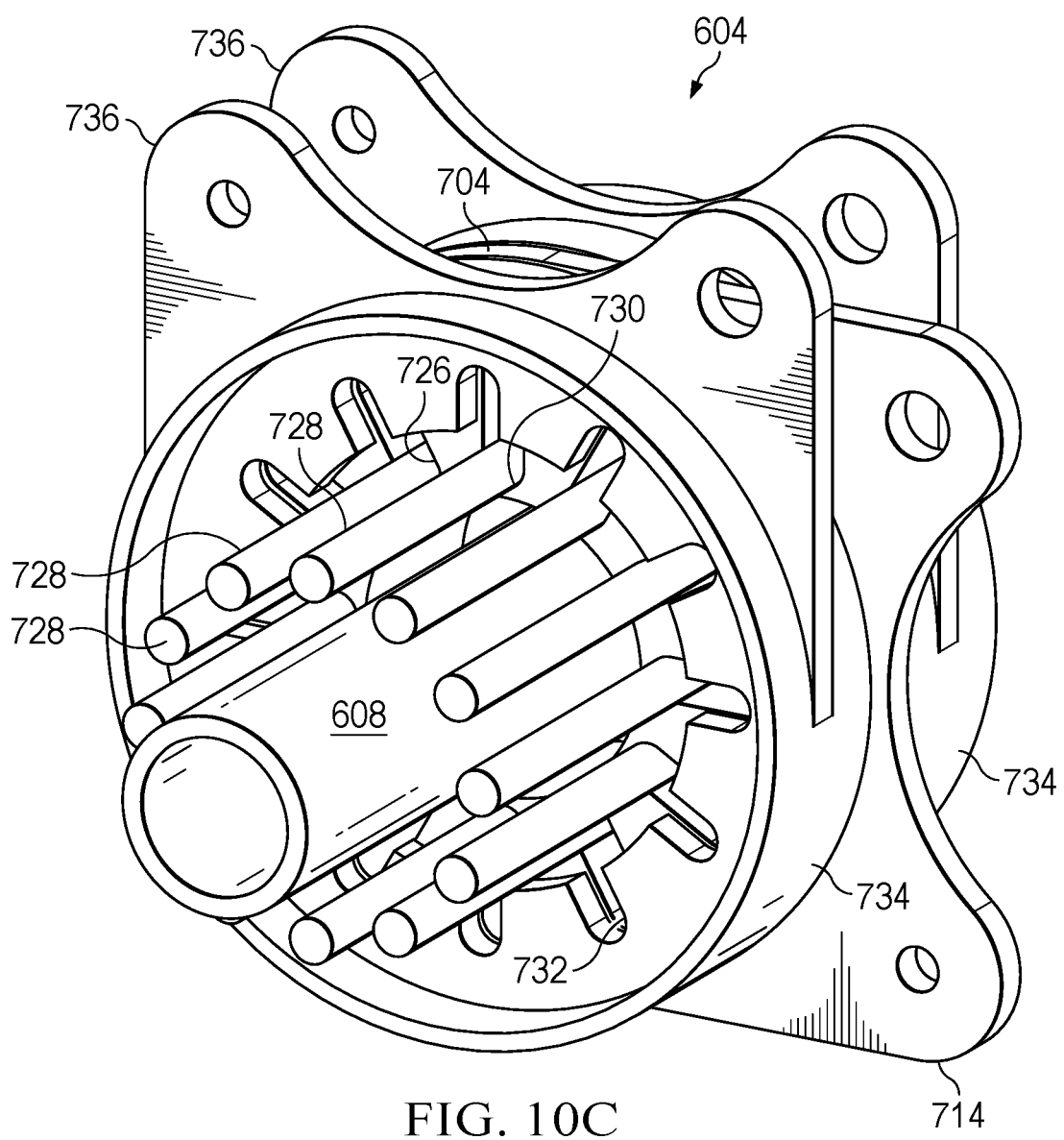
FIG. 10C is a perspective view of a portion of a rotalatch in a folded position and unlatched without a lock-disc, support-ring, or a driving member in accordance with an illustrative embodiment.

FIG. 10A through FIG. 10C show rotalatch 604 in an unlatched condition because all of pins 728 are respectively in unlatched position 730 in slots 726. FIG. 10B is an end-on view of a portion of a rotalatch in a folded position and unlatched without a support-ring or a lock-plate in accordance with an illustrative embodiment. More specifically, as with FIG. 9A, FIG. 9B, and FIG. 10A, FIG. 10B shows latch-lugs 736 for movable member 734 rotated to folded position for unfixed portion 122 as shown in FIG. 2. Distinct from FIG. 9A and FIG. 9B, pins 728 are shown in unlatched position 766 of curved slots 762 in driving member 708. Pins 728 in unlatched position 766 of curved slot 762 in driving member 708 indicates that pins 728 are also in unlatched position 730 of slots 726 in stationary member 704 and also not in notches 742 of stationary member 704, which defines an unlatched position for rotalatch 604.

FIG. 10C is a perspective view of a portion of a rotalatch in a folded position and unlatched without a lock-plate, support-ring, or a driving member in accordance with an illustrative embodiment. More specifically, FIG. 10C shows driving member 708 removed to provide a clearer view of location of all pins 728 out of notches 742 of movable member 734 with unfixed portion 122 rotated to the folded position as shown for wing 104 in FIG. 2.

FIG. 10C shows rotalatch 604 in an unlatched condition because all of pins 728 are not in notches 742. While each of twelve curved slots 762 shown in FIG. 10B is filled, respectively, with a single pin of twelve pins 728, one of ordinary skill in the art recognizes that in some embodiments, not all curved slots 762 may not be filled by one of pins 728, and that number of curved slots 762 may be other than 12 so long as it is at least as many as the number of pins 728.

Figure 11A:
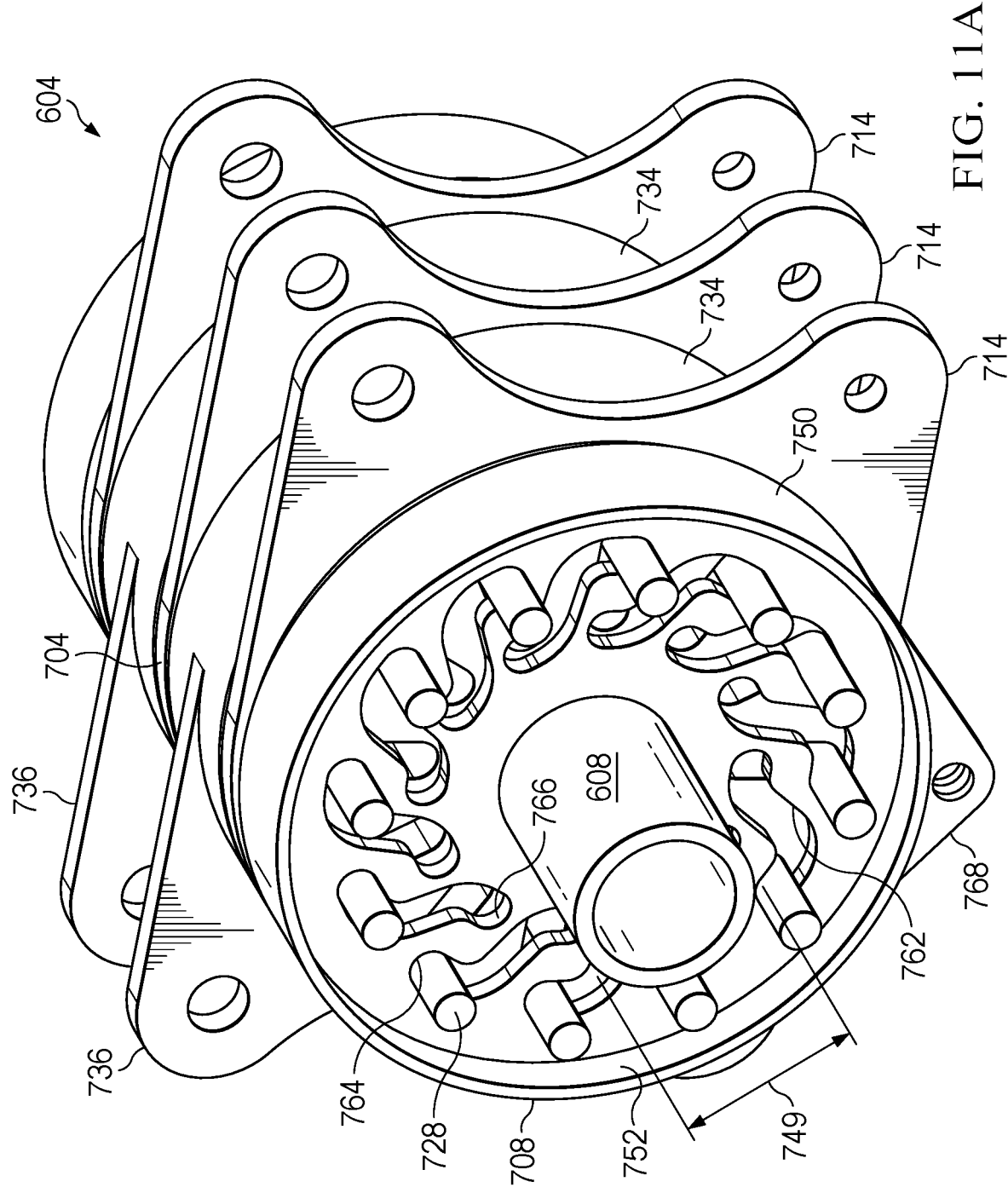
FIG. 11A is a perspective view of a portion of a rotalatch in a flight position and latched without a support-ring or a lock-disc in accordance with an illustrative embodiment.

With reference to FIG. 11A, FIG. 11A shows a perspective view of a portion of a rotalatch in an unfolded position and latched without a support-ring or a lock-plate in accordance with an illustrative embodiment. More specifically, FIG. 11A shows rotalatch 604 with movable member 734 rotated to an unfolded position for unfixed portion 122 as shown for wing 104 in FIG. 1. As with FIG. 8, support-ring 709 and lock-plate 710 have been removed from rotalatch 604 to enable better viewing of pins 728 in driving member 708.

As with FIG. 8, FIG. 11A shows latch-lugs 736 for movable member 734 rotated to flight position for unfixed portion 122 as shown in FIG. 1. Each pin of pins 728 are shown, respectively, in latched position 764 of curved slots 762 in driving member 708. Pins 728 in latched position 764 of curved slots 762 in driving member 708 indicates that pins 728 are also in latched position 732 of slots 726 in stationary member 704 and also in notches 742 of stationary member 704, which defines a latched position for rotalatch 604.

Clevis 768 may provide a connection point for a mechanism (not shown) configured to rotate driving member 708 independent of any motion of movable member 734. Clevis 768 may be configured to connect clevis 768 with a mechanism (not shown) that rotates driving member 708 about central axis 758 of driving member 708. Without limitation, mechanism may be a piston mounted (not shown) on fixed portion 126. Without limitation, when more than one driving member 708 are present in rotalatch 604, each clevis 768 may be connected to its own mechanism, or may be connected to each other clevis 768 on each other driving member 708 such that a single mechanism may rotate all clevis 768 and their associated driving member 708. Without limitation, all clevis 768 may be connected to each other by a single shaft (not shown).

In operation, movable member 734 is moved between its position shown in FIG. 9A to position shown in FIG. 11A by movement of unfixed portion 122 attached to latch-lugs 736. Unfixed portion 122 is moved by rotation of output ring gears 412 inside rotation actuator 602 of rotalliever 600.

In operation, after unfixed portion 122 was moved to flight position as shown for wing 104 by FIG. 1, unfixed portion 122 may be latched into flight position. To latch unfixed portion 122 into flight position clevis 768 would be moved to rotate driving member 708 and thereby move pins 728 into latched position shown by FIG. 11A through FIG. 11B.

Figure 11B:
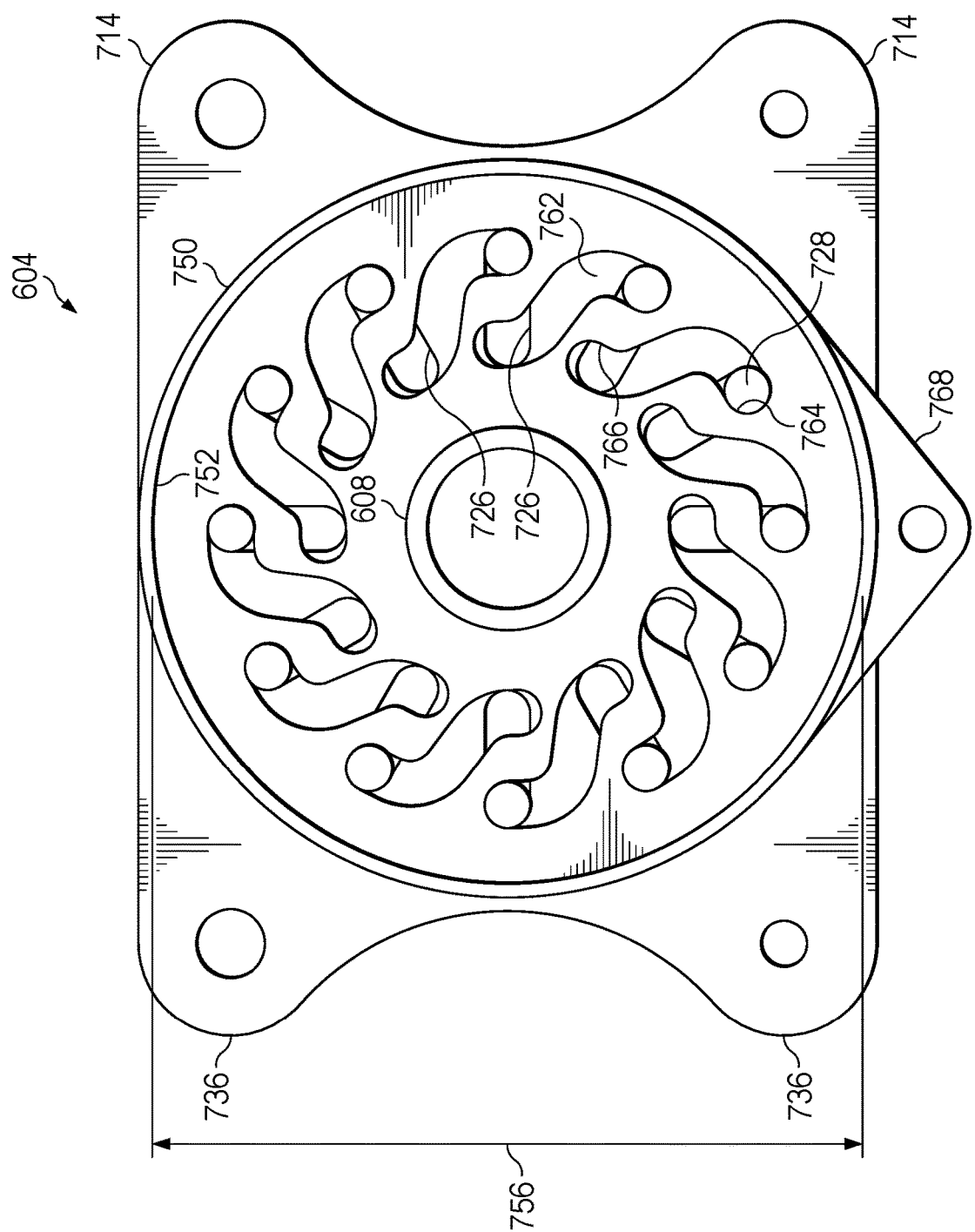
FIG. 11B is an end-on view of a portion of a rotalatch in a flight position and latched without a support-ring or a lock-disc in accordance with an illustrative embodiment.

With reference to FIG. 11B, FIG. 11B shows an end-on view of a portion of a rotalatch in a flight position and latched without a support-ring or a lock-plate in accordance with an illustrative embodiment. More specifically, FIG. 11B is an end-on view of the portion of rotalatch 604 shown in FIG. 11A. As with FIG. 11A, FIG. 11B shows latch-lugs 736 for movable member 734 rotated to flight position for unfixed portion 122 as shown in FIG. 1. Pins 728 are shown in latched position 764 of curved slots 762 in driving member 708. Pins 728 in latched position 764 of curved slot 762 in driving member 708 indicates that pins 728 are also in latched position 732 of slots 726 in stationary member 704 and also in in notches 742 of stationary member 704 defines a latched position for rotalatch 604.

Clevis 768 may provide a connection point for a mechanism (not shown) configured to rotate driving member 708 independent of any motion of movable member 734. Clevis 768 may be configured to connect clevis 768 with a mechanism (not shown) that rotates driving member 708 about central axis 758 of driving member 708. Without limitation, a mechanism may be a piston mounted (not shown) on fixed portion 126. Without limitation, when more than one driving member 708 are present in rotalatch 604, each clevis 768 may be connected to its own mechanism, or each clevis 768 may be connected to each other clevis 768 such that a single mechanism connected to a single clevis 768 may rotate all clevis 768 and their associated driving member 708. Without limitation, all clevis 768 may be connected to each other by a single shaft (not shown).

Figure 11C:
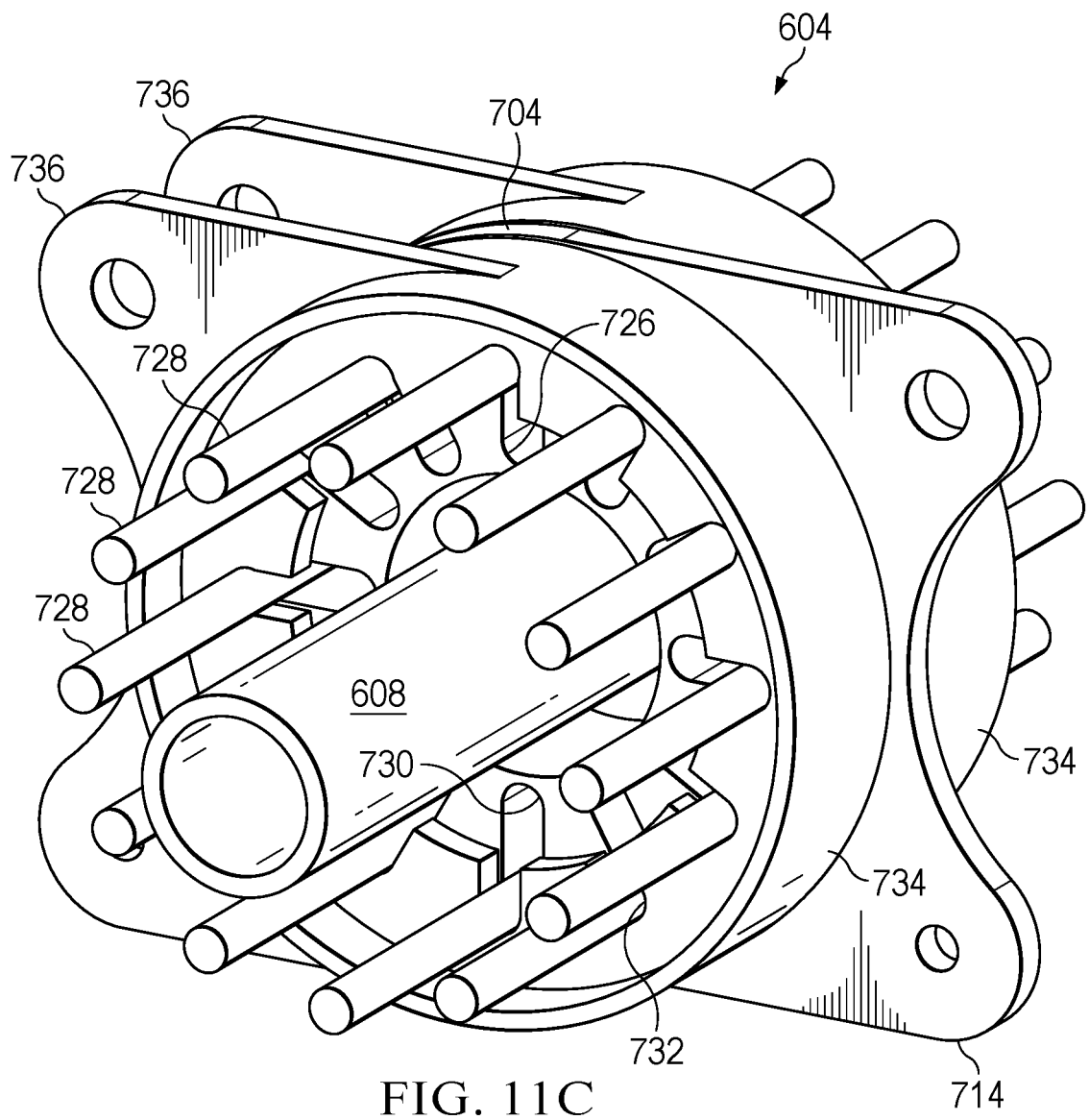
FIG. 11C is a perspective view of a portion of a rotalatch in a flight position and latched without a lock-disc, support-ring, or a driving member in accordance with an illustrative embodiment.

With reference to FIG. 11C, FIG. 11C shows a perspective view of a portion of a rotalatch in a flight position and latched without a lock-plate, support-ring, or a driving member in accordance with an illustrative embodiment. More specifically, FIG. 11C shows side view of rotalatch 604 from FIGS. 11A and 9B, but with driving member 708 removed to provide a clearer view of location of pins 728 in notches 742 of movable member 734 when rotated to the flight position for unfixed portion 122 as shown for wing 104 in FIG. 1.

While each of twelve notches 742 shown in FIG. 11C is filled with a single pin of twelve pins 728, one of ordinary skill in the art recognizes that in some embodiments, not all notches 742 may be filled by one of pins 728, and that number of notches 742 may be other than twelve so long as it is at least as many as the number of pins 728. FIG. 11C shows rotalatch 604 in a latched condition because all of pins 728 are respectively in latched position 732 in slots 726.

With reference to FIG. 12A, FIG. 12A is a perspective view of a portion of a rotalatch in a flight position and unlatched without support-ring or a lock-plate in accordance with an illustrative embodiment. More specifically, FIG. 12A shows rotalatch 604 with movable member 734 rotated to a flight position for unfixed portion 122 as shown for wing 104 in FIG. 1. As with FIG. 8 and FIG. 11A, support-ring 709 and lock-plate 710 have been removed from rotalatch 604 to enable better viewing of pins 728 in driving member 708.

In operation, when it is desired to move unfixed portion 122 out of flight position as shown for wing 104 by FIG. 1, pins 728 must be moved to unlatched position 766 in curved slots 762 of driving member 708 and unlatched position 730 in slots 726 of stationary member 704. To unlatch pins 728, clevis 768 would be moved to rotate driving member 708 and thereby move pins 728 into unlatched position 766 shown by FIG. 12A and FIG. 12B.

While each of twelve curved slots 762 shown in FIG. 12A is filled with a single pin of twelve pins 728, one of ordinary skill in the art recognizes that in some embodiments, not all curved slots 762 may be filled by one of pins 728, and that number of pins 728 may be other than twelve. Number of pins 728 may be based upon a desired load distribution and/or amount of rotation. Desired load distribution may be for pins 728 and or other components of rotalliever 600.

Figure 12B:
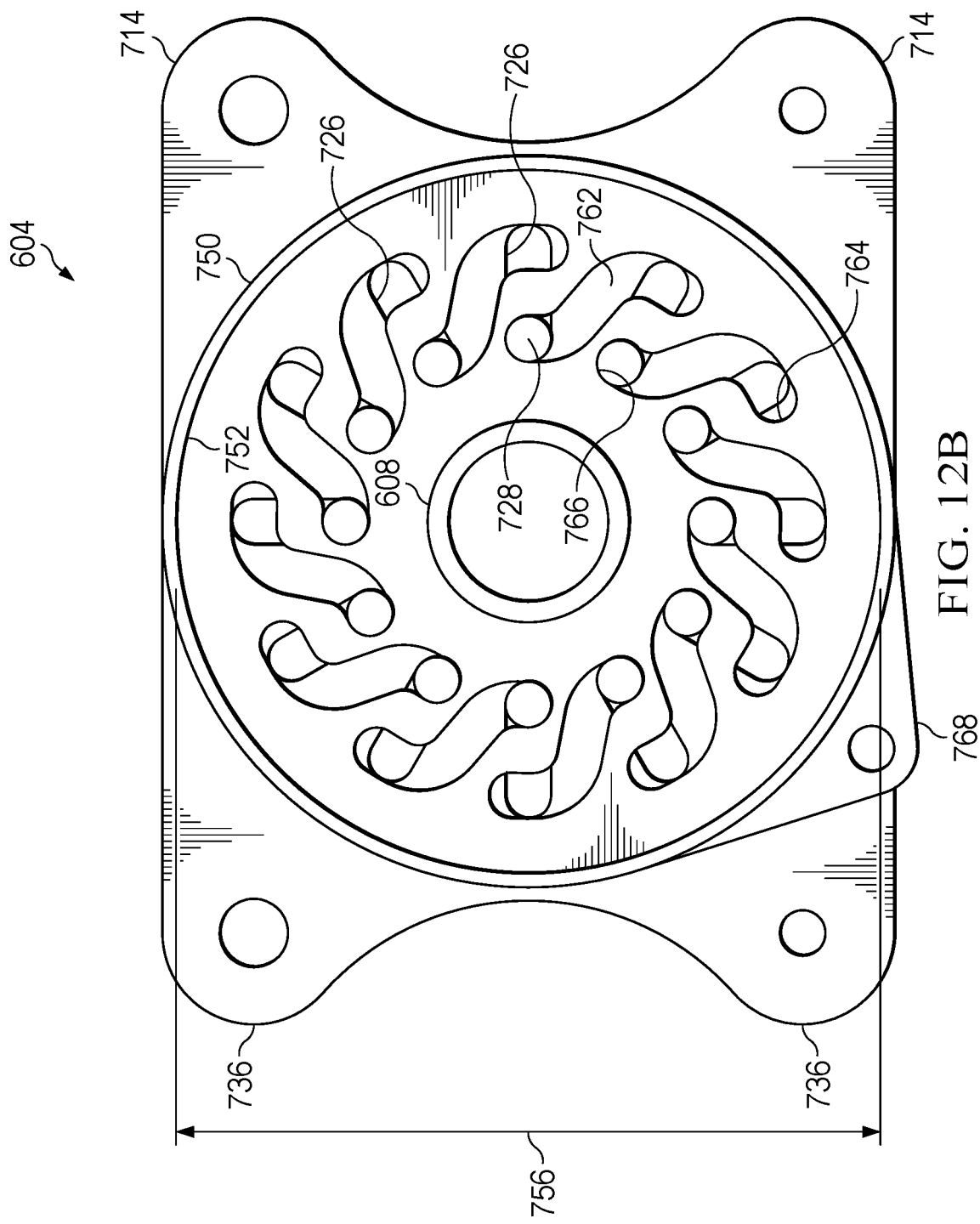
FIG. 12B is an end-on view of a portion of a rotalatch in a flight position and unlatched without a support-ring or a lock-disc in accordance with an illustrative embodiment.
Figure 12C:
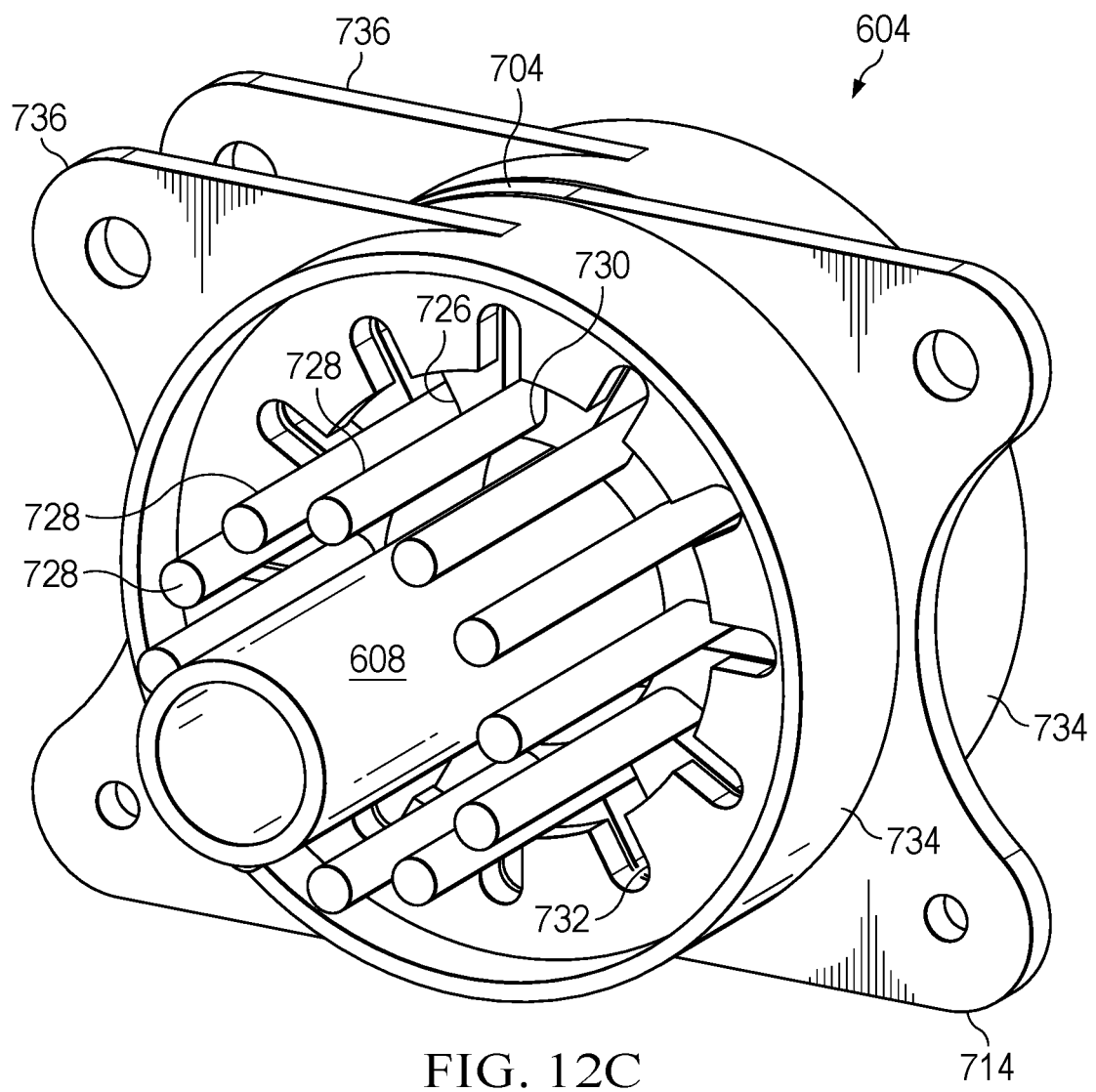
FIG. 12C is a perspective view of a portion of a rotalatch in a flight position and unlatched without a lock-disc, support-ring, or a driving member in accordance with an illustrative embodiment.

FIG. 12A through FIG. 12C show rotalatch 604 in an unlatched condition because all of pins 728 are respectively in unlatched position 730 in slots 726. FIG. 12B is an end-on view of a portion of a rotalatch in a flight position and unlatched without a support-ring or a lock-plate in accordance with an illustrative embodiment. More specifically, as with FIG. 11A, FIG. 11B, and FIG. 12A, FIG. 12B shows latch-lugs 736 for movable member 734 rotated to flight position for unfixed portion 122 as shown in FIG. 1. Distinct from FIG. 11A and FIG. 11B, pins 728 are shown in unlatched position 766 of curved slot 762 in driving member 708. Pins 728 in unlatched position 766 of curved slot 762 in driving member 708 indicates that pins 728 are also in unlatched position 730 of slots 726 in stationary member 704 and also not in notches 742 of stationary member 704, which defines an unlatched position for rotalatch 604.

FIG. 12C is a perspective view of a portion of a rotalatch in a flight position and unlatched without a lock-plate, support-ring, or a driving member in accordance with an illustrative embodiment. More specifically, FIG. 12C shows driving member 708 removed to provide a clearer view of location of all pins 728 out of notches 742 of movable member 734 with unfixed portion 122 rotated to the flight position as shown for wing 104 in FIG. 1.

FIG. 12C shows rotalatch 604 in an unlatched condition because all of pins 728 are not in notches 742. While each of twelve curved slots 762 shown in FIG. 12B is filled, respectively, with a single pin of twelve pins 728, one of ordinary skill in the art recognizes that in some embodiments, not all curved slots 762 may not be filled by one of pins 728, and that number of curved slots 762 may be other than twelve so long as it is at least as great as the number of pins 728.

Figure 13A:
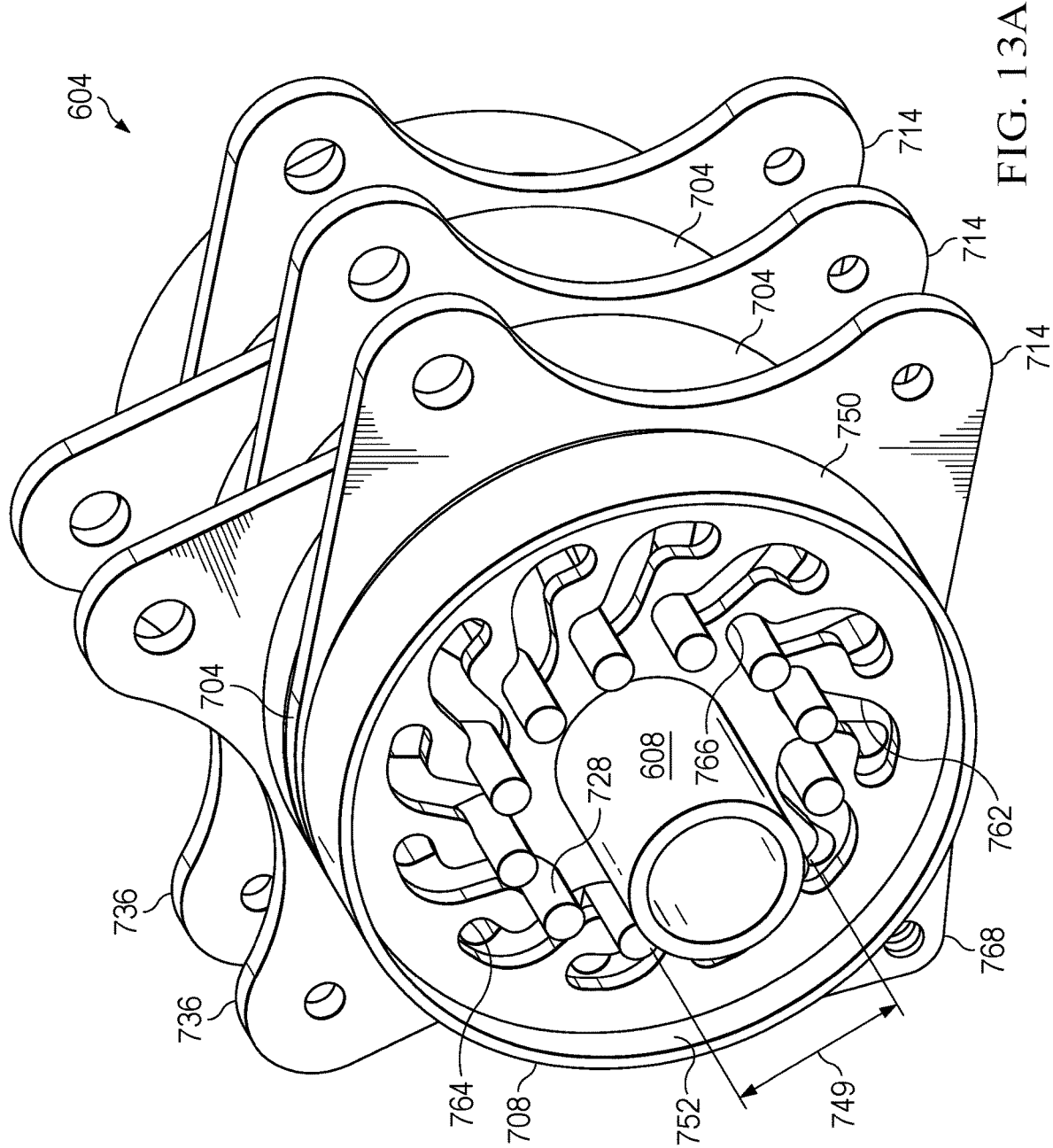
FIG. 13A is a perspective view of a portion of a rotalatch in-between a flight position and a folded position, unlatched, and without support-ring or a lock-disc, in accordance with an illustrative embodiment.

With reference to FIG. 13A, FIG. 13A is a perspective view of a portion of a rotalatch in-between a flight position and a folded position, unlatched, and without support-ring or a lock-plate, in accordance with an illustrative embodiment. More specifically, FIG. 13A shows rotalatch 604 with movable member 734 with latch-lugs 736 rotated latch in-between a flight position and a folded position for unfixed portion 122 of wing 104. As with FIG. 8 and FIG. 11A, support-ring 709 and lock-plate 710 have been removed from rotalatch 604 to enable better viewing of pins 728 in driving member 708.

In operation, when it is desired to move unfixed portion 122 between flight position as shown for wing 104 by FIGS. 1, 8, 11A-12C, 14, and 16, and folded position for wing 104 as shown by FIGS. 2, 7, and 9A-10C, pins 728 must be moved to unlatched position 766 in curved slots 762 of driving member 708 and unlatched position 730 in slots 726 of stationary member 704. To unlatch pins 728, clevis 768 would be moved to rotate driving member 708 and thereby move pins 728 into unlatched position 766 shown by FIG. 13A, FIG. 13B, and FIG. 13C.

While each of twelve curved slots 762 shown in FIG. 13A is filled with a single pin of twelve pins 728, one of ordinary skill in the art recognizes that in some embodiments, not all curved slots 762 may be filled by one of pins 728, and that number of pins 728 may be other than twelve. Number of pins 728 may be based upon a desired load distribution and/or amount of rotation. Desired load distribution may be for pins 728 and or other components of rotalliever 600.

One of ordinary skill in the art recognizes that when pins 728 are in notches 742 (as shown at least in FIG. 9A through FIG. 9C and FIG. 11A through 11C) that external forces may act on unfixed portion 122 and/or fixed portion 126 that act to attempt to rotate unfixed portion 122 from selected angle relative to fixed portion 126 to which unfixed portion 122 has been rotated by rotation actuator 602 and latched. Without limitation, when unfixed portion 122 is a wing tip of an aircraft such as aircraft 100, external forces may include wind gusts, exhaust from neighboring engines, and various forces generated during taxiing aircraft 100. Pins 728 in latched position 732 resist external forces trying to rotate unfixed portion 122 and therefore movable member 734 in torque about central axis 744 and are placed in shear. One of ordinary skill in the art recognizes that when pins 728 extend through two or more stationary member 704 and/or two or more movable member 734, that pins 728 react to torque forces in double-shear. Thus, at least because of the double-shear loading on pins 728 used to latch rotalatch 604 when configured with two or more stationary member 704 and/or two or more movable member 734, each pin in pins 728 may be less strong, smaller, and lighter than if configured with only a single stationary member 704 and a single movable member 734 where pins 728 would react to entire torque in shear instead of double-shear.

FIG. 12A through FIG. 12C show rotalatch 604 in an unlatched condition because all of pins 728 are respectively in unlatched position 730 in slots 726.

Figure 13B:
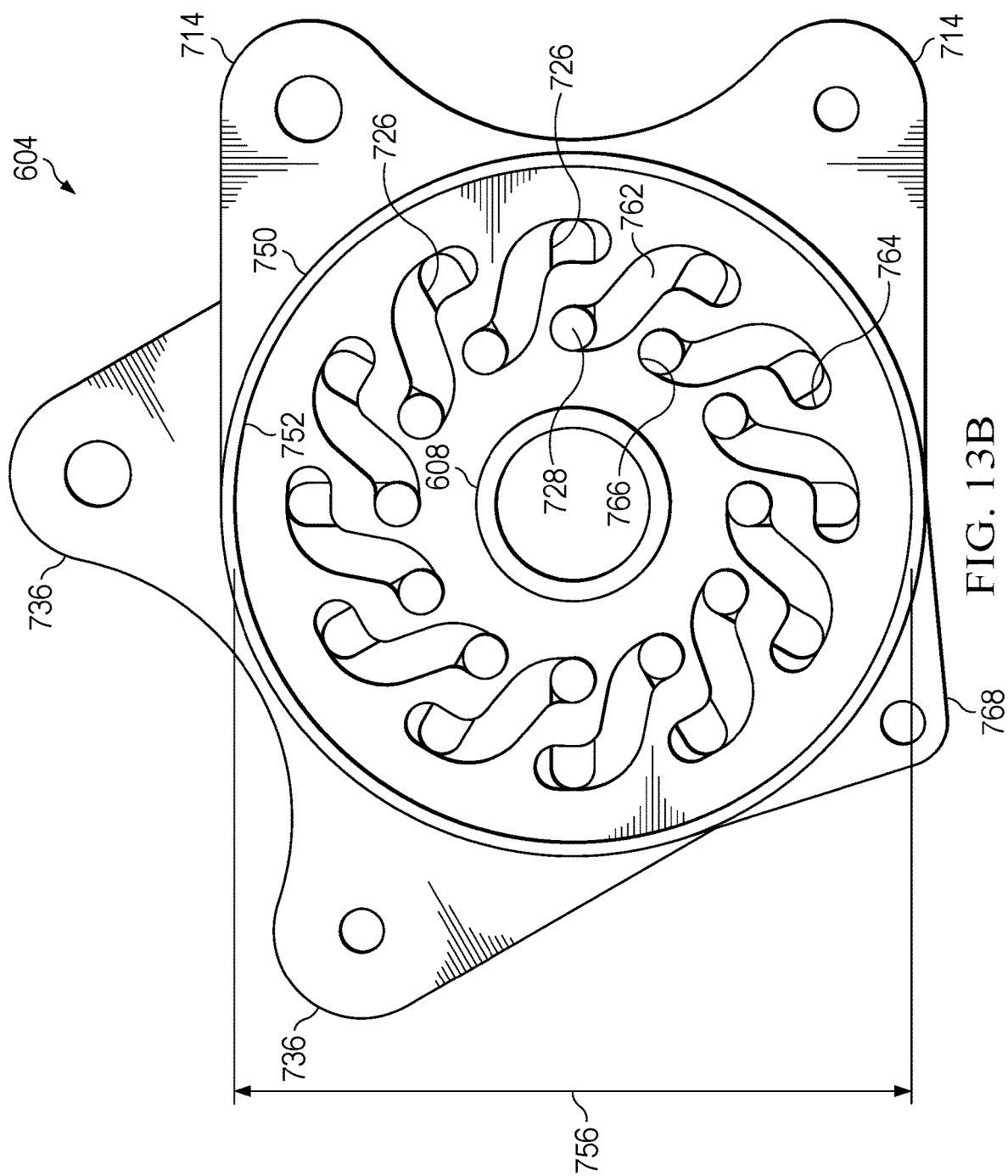
FIG. 13B is an end-on view of a portion of a rotalatch in-between a flight position and a folded position, unlatched, and without a support-ring or a lock-disc, in accordance with an illustrative embodiment.

FIG. 13B is an end-on view of a portion of a rotalatch in-between a flight position and a folded position, unlatched, and without a support-ring or a lock-plate in accordance with an illustrative embodiment. More specifically, as with FIG. 13A, FIG. 13B shows latch-lugs 736 for movable member 734 rotated in-between flight position as shown for wing 104 FIGS. 1, 8, 11A-12C, 14, and 16 and folded position for wing 104 as shown by FIGS. 2, 7, and 9A-10C.

Figure 13C:
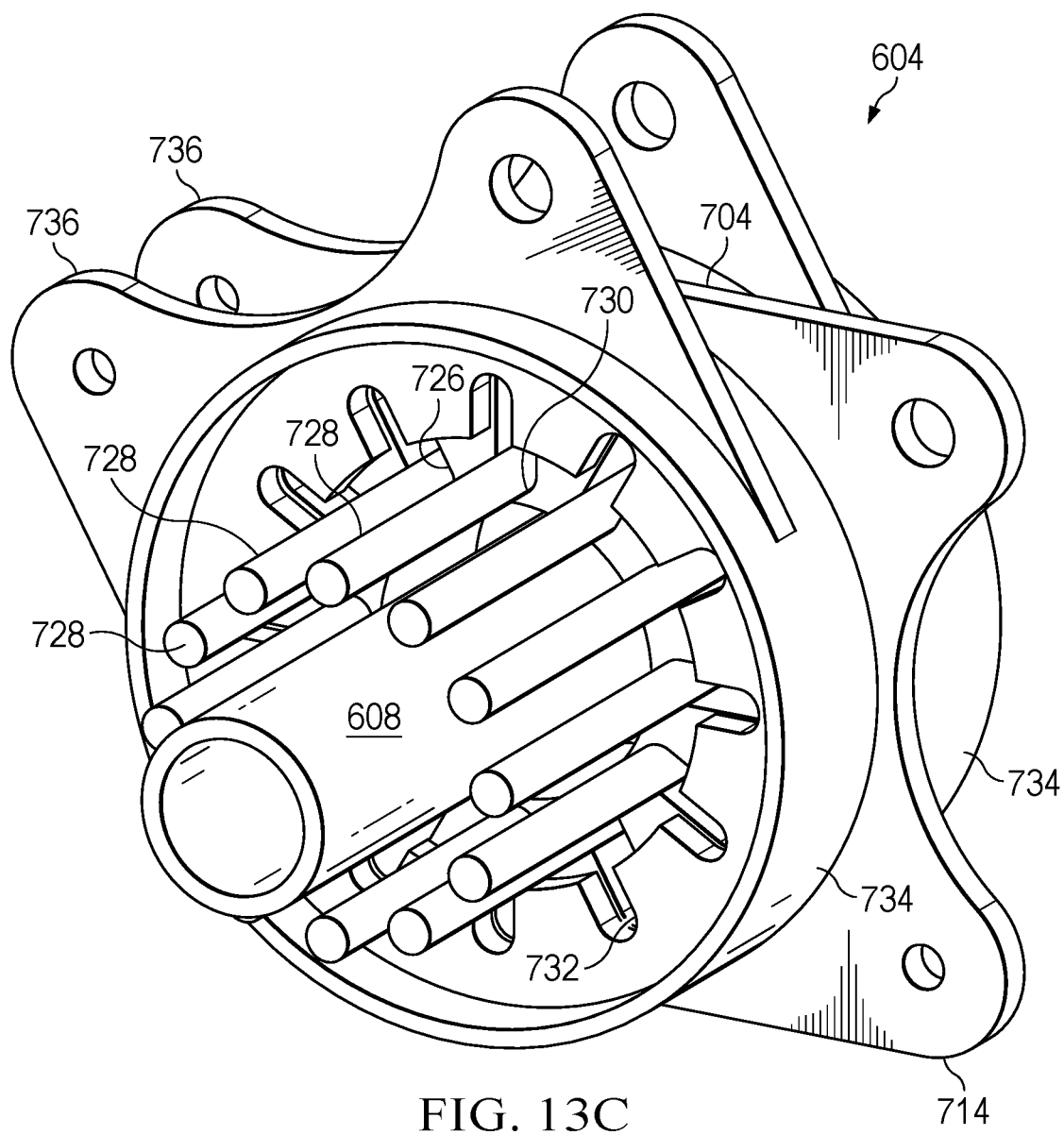
FIG. 13C is a perspective view of a portion of a rotalatch in-between a flight position and a folded position, unlatched, and without a lock-disc, support-ring, or a driving member, in accordance with an illustrative embodiment.

In FIG. 13A-13C, pins 728 are shown in unlatched position 766 of curved slot 762 in driving member 708. Pins 728 in unlatched position 766 of curved slots 762 in driving member 708 indicates that pins 728 are also in unlatched position 730 of slots 726 in stationary member 704 and also not in notches 742 of stationary member 704, which defines an unlatched position for rotalatch 604.

FIG. 13C is a perspective view of a portion of a rotalatch in-between a flight position and a folded position, unlatched, and without a lock-plate, support-ring, or a driving member, in accordance with an illustrative embodiment. More specifically, FIG. 13C shows driving member 708 removed to provide a clearer view of location of all pins 728 out of notches 742 of movable member 734 with unfixed portion 122 rotated in-between the flight position as shown for wing 104 in FIG. 1 and the folded position as shown for wing 104 in FIG. 2 as indicated by position of latch-lugs 736 of movable member 734, which may be connected to unfixed portion 122.

FIG. 13C shows rotalatch 604 in an unlatched condition because all of pins 728 are not in notches 742. While each of twelve curved slots 762 shown in FIG. 13B is filled, respectively, with a single pin of twelve pins 728, one of ordinary skill in the art recognizes that in some embodiments, not all curved slots 762 may not be filled by one of pins 728, and that number of curved slots 762 may be other than twelve so long as it is at least as great as the number of pins 728.

Figure 14:
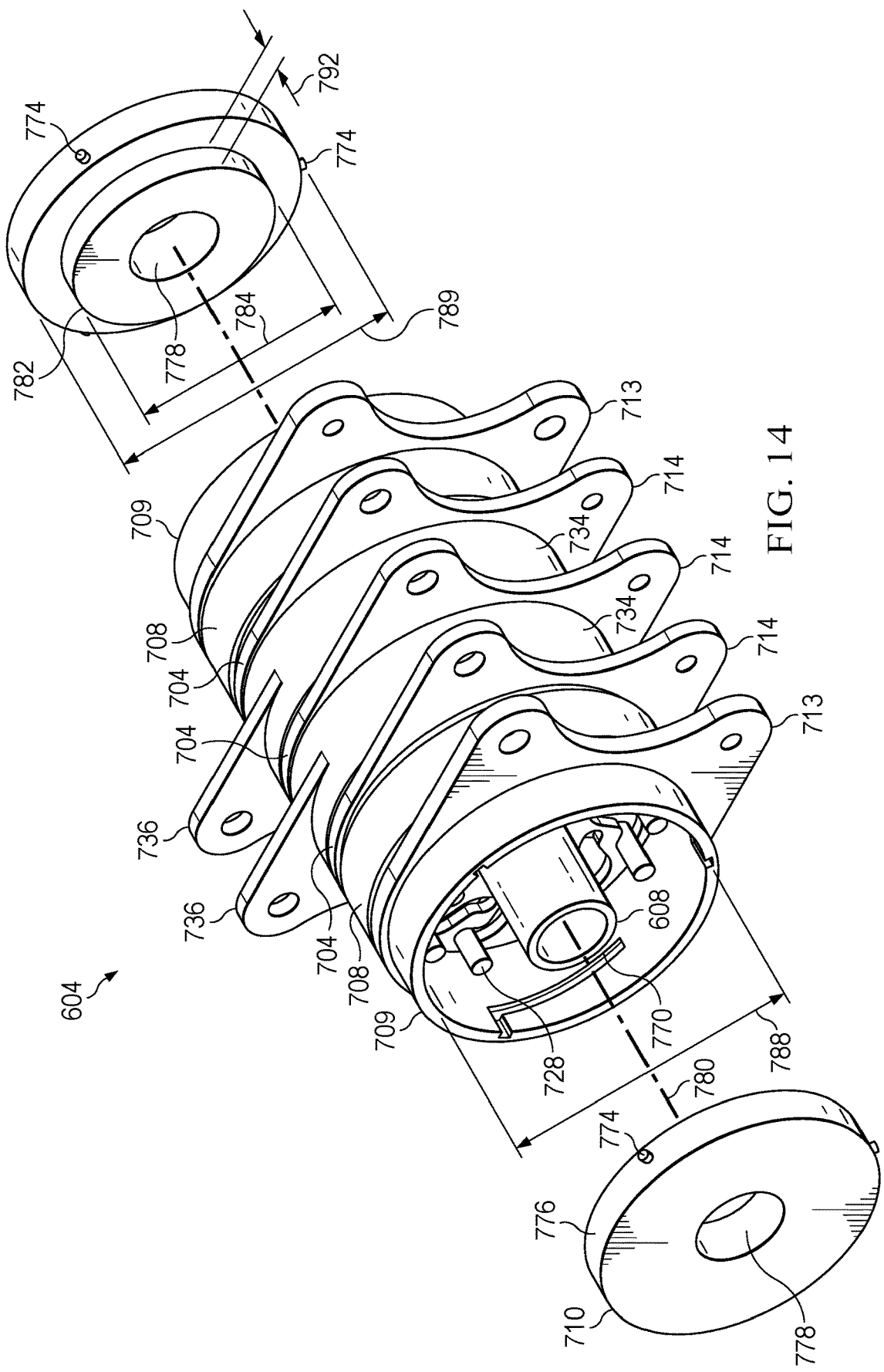
FIG. 14 is a perspective view of a rotalatch with a lock-disc and a support-ring in accordance with an illustrative embodiment.

FIG. 14 is a perspective view of a rotalatch with a lock-plate and a support-ring 709 in accordance with an illustrative embodiment. More specifically, FIG. 14 shows rotalatch 604 as shown in FIG. 8, but with support-ring 709 and lock-plate-710 also shown.

Support-ring 709 may include at least: grooves 770, support-lugs 713, and diameter 788 across interior of support-ring 709. Support-lugs 713 may extend from exterior perimeter 776 of support-ring 709. Support-lugs 713 may be aligned with fixed-lugs 714 and attached to fixed portion 126.

Grooves 770 are located within an interior surface of support-ring 709. Grooves 770 may be sized and shaped to receive and retain nubs 774 that extend from lock-plate 710.

Lock-plate 710 may include at least: nubs 774 that extend outward from exterior perimeter 776, central axis 780, central opening 778, lock-disc 782, and diameter 789. Lock-disc 782 may have at least: diameter 784, height 792, and outer-wall 794. Diameter 784 of lock-disc 782 may be sized to fit within central opening 745 of movable member 734. In other words, diameter 784 of lock-disc 782 is less than a distance between pins 728 in latched position 732 in slots 726 in stationary member 704. Height 792 of lock-disc 782 may exceed a distance that a pin of pins 728 extends beyond interior-extension 740 of movable member 734.

Central opening 778 of lock-plate 710 may be sized to surround cylinder 608 and to move axially and to rotate about central cylinder 608. Diameter 789 of lock-plate 710 is less than diameter 788 across interior of support-ring 709.

Figure 15A:
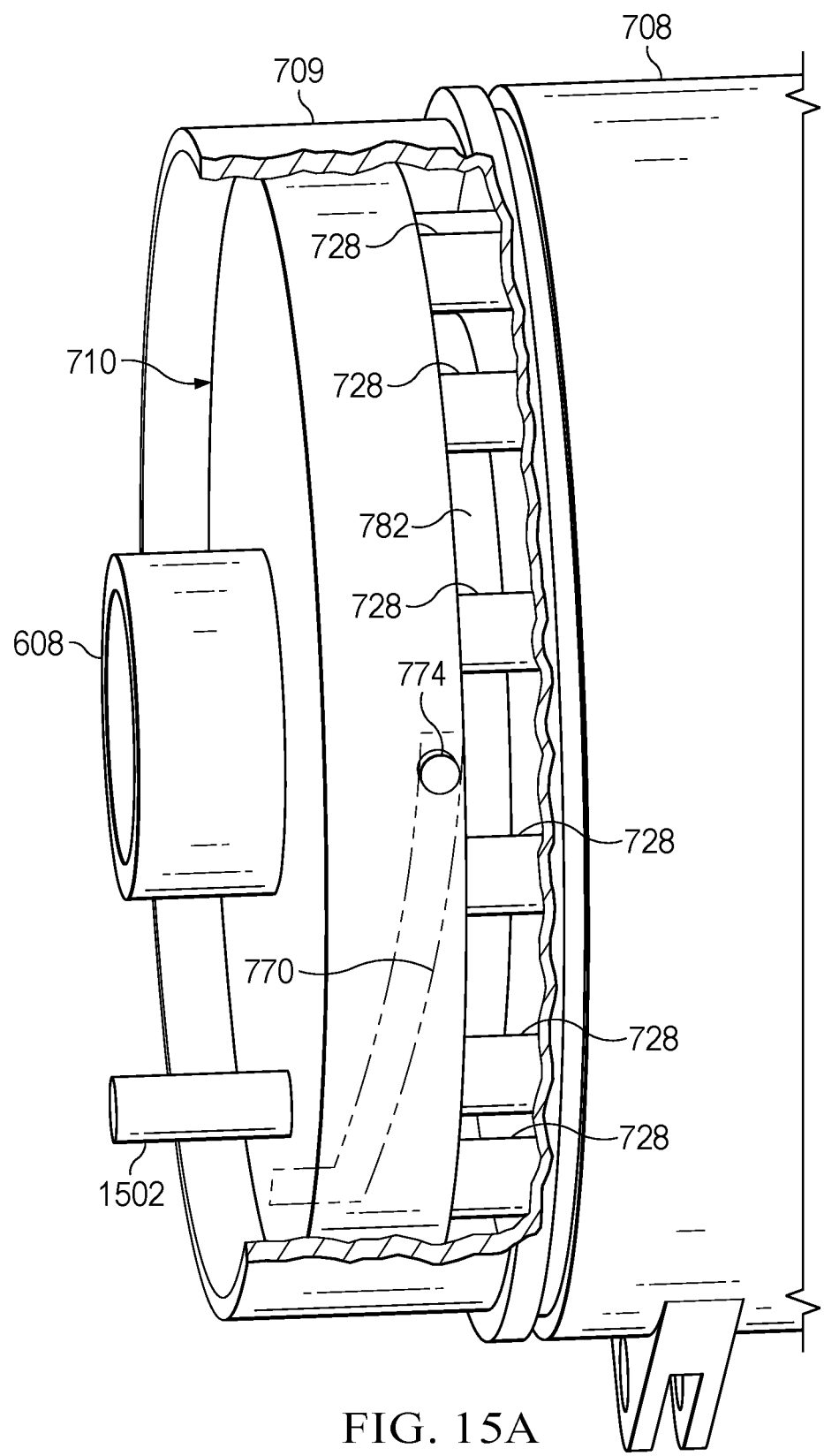
FIG. 15A is a perspective view of a lock-disc in a locked position within a support-ring of a rotalatch in accordance with an illustrative embodiment.

Now looking at FIG. 15A, FIG. 15A is a perspective view of a rotalatch with a lock-plate in a locked position within a support-ring in accordance with an illustrative embodiment. More specifically, FIG. 15A shows lock-plate 710 in a locked position defined by: nubs 774 engaged within grooves 770 and lock-disc 782 being within pins 728 such that pins 728 may not move out of latched position 732 in slots 726. Lock-plate 710 may have lock-lever 1502 that extends from side of lock-plate 710 away from lock-disc 782.

In operation, lock-plate 710 may be moved axially along cylinder 608 (by a lock actuator not shown) from a position away from support-ring 709 (as shown in FIG. 14) to the position of lock-plate 710 shown in FIG. 15A within support-ring 709 that locks pins 728 in latched position 732 in slots 726. Axial motion along cylinder 608 may include rotational motion around central axis 780 of lock-plate 710 and corresponding central axis 780 of lock-plate 710 which coincides with central axis 702 of cylinder 608.

Without limitation, a lock actuator may connect (not shown) to lock-lever 1502. Without limitation, connection of lock-actuator to lock-lever may be a rod that extends from a piston. In an embodiment, a lock actuator may be mounted in and extend from fixed portion 126 perpendicular to central axis 780 to rotate lock-plate 710 around central axis 780 and thereby translate lock-plate 710 along cylinder 608 and central axis 780 via helical movement of nubs 774 within helical grooves 770 within support-ring 709.

FIG. 7 illustrates that central axes of each component of rotalliever 600 are all coincident. In other words, at least central axis 702 of cylinder 608, central axis 722 of rotalliever 600 stationary member 704, central axis 744 of movable member 734, central axis 758 of driving member 708, and central axis 780 of lock-plate 710, are all coincident.

In an alternate embodiment, a lock actuator may connect to lock-lever 1502 to apply a force onto lock-lever 1502 and lock-plate 710 parallel to central axis 780. In this embodiment the axial force on lock-plate 710 will drive the rotation of lock-plate 710 around central axis 780 and cylinder 608 via helical movement of nubs 774 within helical grooves 770 within support-ring 709. One of ordinary skill in the art recognizes that depending upon desired design and location of a lock actuator, that actual size, shape, and location of lock-lever 1502 on lock-plate may be varied from that shown in FIG. 15A through FIG. 16.

Diameter 784 of lock-disc 782 of lock-plate 710 may be sized to be surrounded by pins 728 when pins 728 are 728 in latched position 732 in slots 726. For further support of locked position, once lock-plate 710 has entered within support-ring 709 with nubs 774 axially entered into grooves 770, the lock actuator (not shown) may then rotate lock-plate 710 so that nubs 774 travel radially within grooves 770 of support-ring 709 sufficient to prevent nubs 774 and lock-plate 710 from exiting support-ring 709 axially along cylinder 608.

To unlock lock-plate 710 and allow pins 728 to move out of latched position 732 in slots 726 toward unlatched position 730 in slots 726, the process above may be reversed. A sensor system (not shown) may also be present in rotalliever 600 and/or rotalatch 604 to detect and send a signal (a locked/unlocked signal) that indicates when lock-plate 710 is or is not within support-ring 709 in a position such that nubs 774 are—or are not—in grooves 770 in a position such that lock-disc 782 has locked pins 728 in latched position 732 in slots 726 of stationary member 704 and hence within notches 742 in movable member 734. In other words, a sensor system (not shown) may also be present in rotalatch 604 to detect and send a signal that indicates when lock-plate 710 is or is not within support-ring 709 in a position such that nubs 774 are or are not deep enough inside driving member 708 such that it is surrounded by pins 728 are in grooves 770 in a position such that lock-disc 782 has locked pins 728 in latched position within notches 742 in movable member 734.

Similarly, an additional sensor system (not shown) may also be present in rotalliever 600 and/or rotalatch 604 to detect and send a (latched/unlatched) signal that indicates when pins 728 are in latched position 732 or in unlatched position 730 in slots 726 within stationary member 704. One of ordinary skill in the art recognizes that this also indicates that pins 728 are in latched position 764 or unlatched position 766 in curved slots 762 of driving member 708.

Figure 15B:
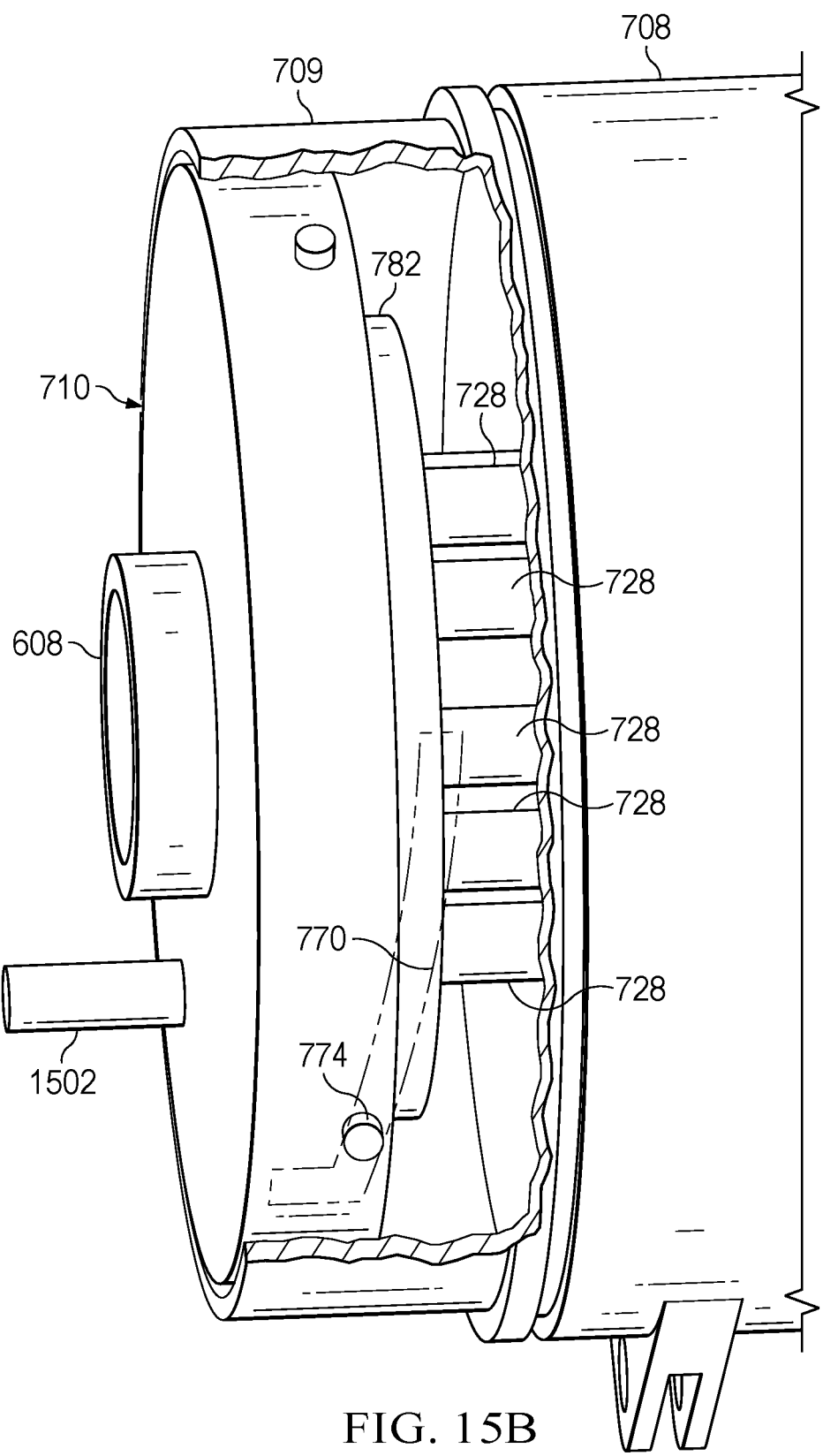
FIG. 15B is a perspective view of a lock-disc in an unlocked position and a support-ring of a rotalatch in accordance with an illustrative embodiment.

FIG. 15B is a perspective view of a lock-plate in an unlocked position and a support-ring of a erotalatch in accordance with an illustrative embodiment. More specifically, FIG. 15B shows that lock-plate 710 cannot be axially displaced inside support-ring 709 because nubs 774 cannot be rotated within grooves 770 about central axis 780 to move lock-disc 782 within pins 728 when pins 728 are not in latched position 732 in slots 726. FIG. 15B shows that when pins 728 are not in latched position 732 in slots 726, ends of pins 728 impact into lock-disc 782 and thereby prevent lock-plate 710 from being axially displaced inside support-ring 709 (by lock actuator not shown) hence and nubs 774 cannot insert fully into and be rotated within grooves 770.

Figure 16:
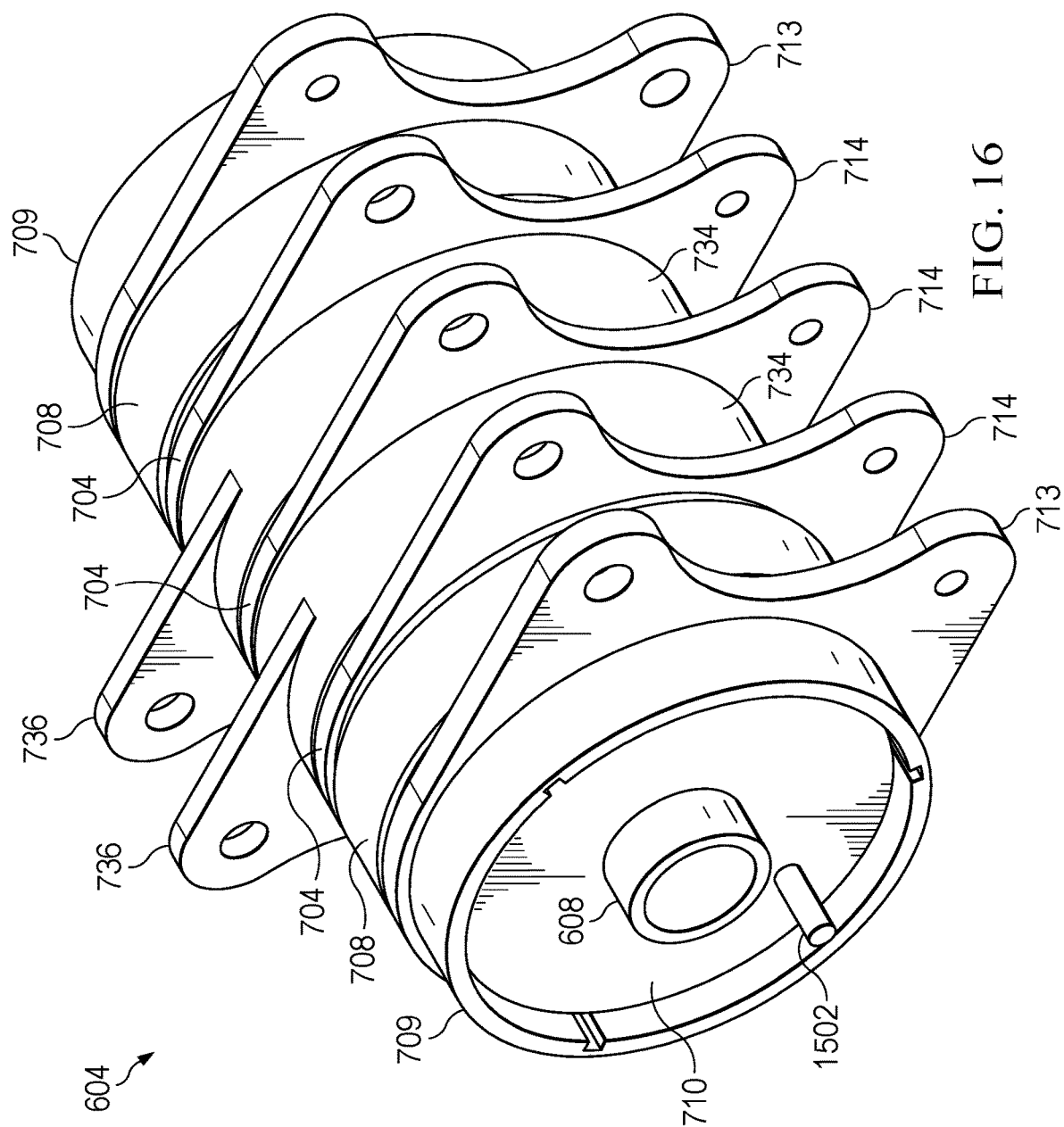
FIG. 16 is a perspective view of a rotalatch in position for an unfixed portion to be in a flight position and locked in accordance with an illustrative embodiment.

With reference now to FIG. 16, FIG. 16 is a perspective view of a rotalatch in position for an unfixed portion to be in a flight position and locked in accordance with an illustrative embodiment. More specifically, FIG. 16 shows rotalatch 604 with latch-lugs 736 of movable member 734 approximately 180 degrees away from fixed-lugs 714 indicating that unfixed portion 122 is in a flight position. Rotalatch 604 is locked in the flight position because lock-plate 710 is fully within support-ring 709.

Figure 17:
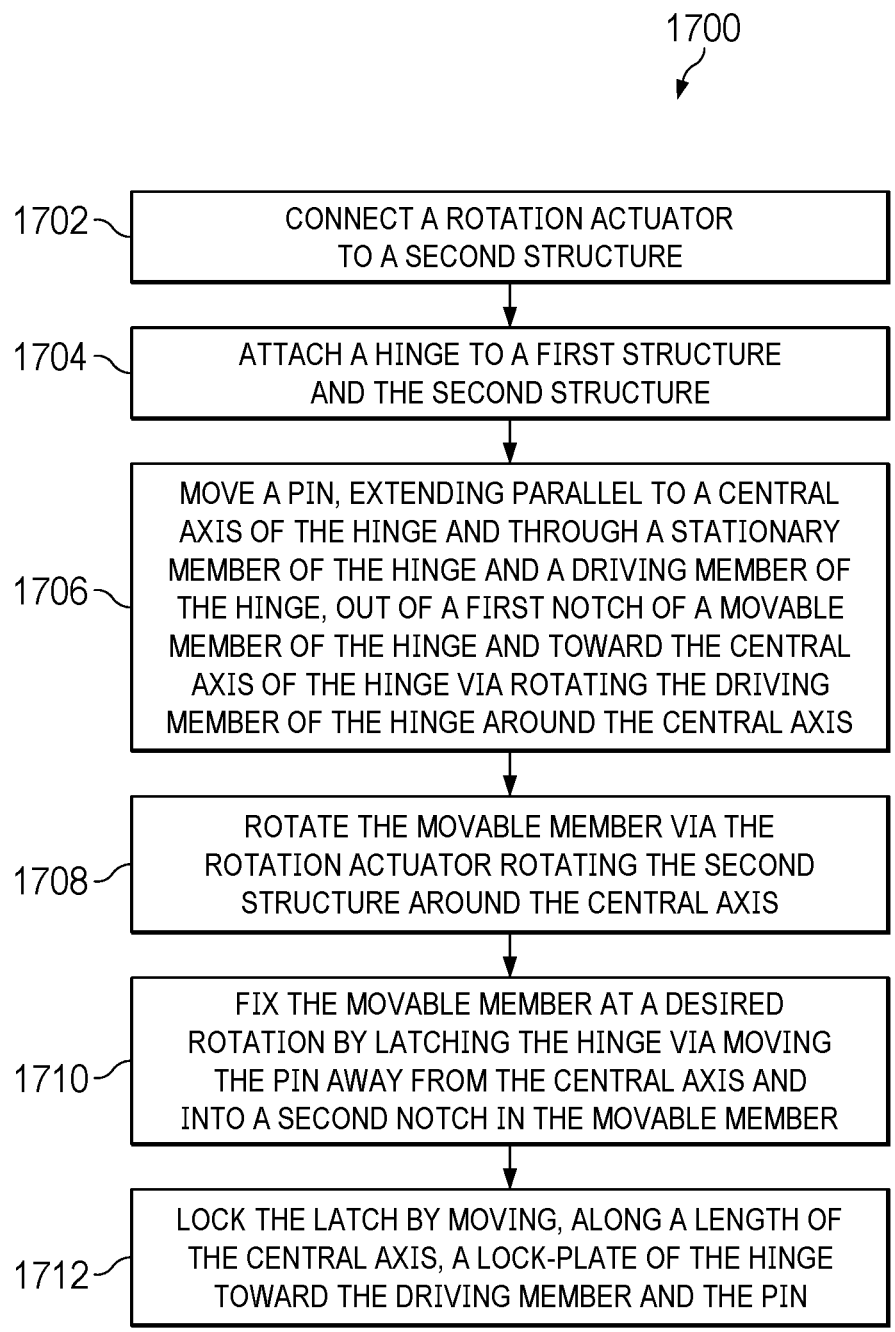
FIG. 17 is a flow diagram of a process for rotating and fixing a second structure relative to a first structure, the process comprising in accordance with an illustrative embodiment.

With reference now to FIG. 17, FIG. 17 is a flow diagram of a process for rotating and fixing a second structure relative to a first structure, the process comprising in accordance with an illustrative embodiment. More specifically, operations for process 1700 for rotating and fixing a second structure relative to a first structure is shown. Process 1700 may begin by connecting a rotation actuator to a second structure (operation 1702). As discussed above, although embodiments shown herein may have an unfixed portion and a fixed portion of a wing of an aircraft as the first structure and the second structure, one of ordinary skill in the art recognized that the embodiments shown may apply to structures other than portions of a wing of an aircraft.

Without limitation, process 1700 for rotating and fixing a second structure relative to a first structure may continue by, attaching a hinge to a first structure and the second structure (operation 1704). Process 1700 may continue by moving a pin, extending parallel to a central axis of the hinge and through a stationary member of the hinge and a driving member of the hinge, out of a first notch of a movable member of the hinge and toward the central axis of the hinge via rotating the driving member of the hinge around the central axis (operation 1706). Process 1700 may include rotating the movable member via the rotation actuator rotating the second structure around the central axis (operation 1708) and fixing the movable member at a desired rotation by latching the hinge via moving the pin away from the central axis and into a second notch in the movable member (operation 1710). Process 1700 may also include locking the latch by moving, along a length of the central axis, a lock-plate of the hinge toward the driving member and the pin (operation 1712). The process may terminate thereafter. The process may also be reversed.

One of skill in the art recognizes that process 1700 may also include forming each pin with dimensions and a material configured for carrying loads from the second structure with the pin in without limitation the first notch or the second notch. The process may also include moving the lock-plate of the hinge toward the driving member and the pin by rotating the lock-plate around the central axis. The process may also include indicating when the pin is locked or unlocked.

Figure 18:
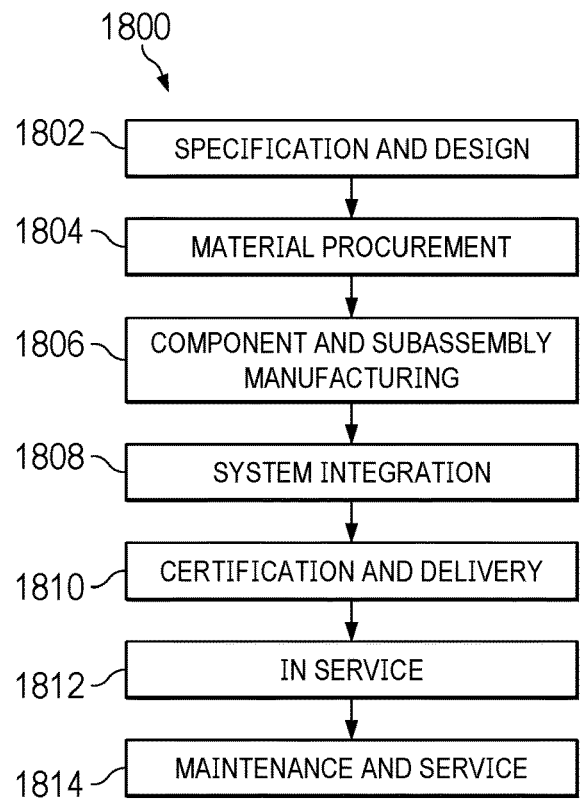
FIG. 18 is an illustration of an aircraft manufacturing and service method in accordance with an illustrative embodiment.
Figure 19:
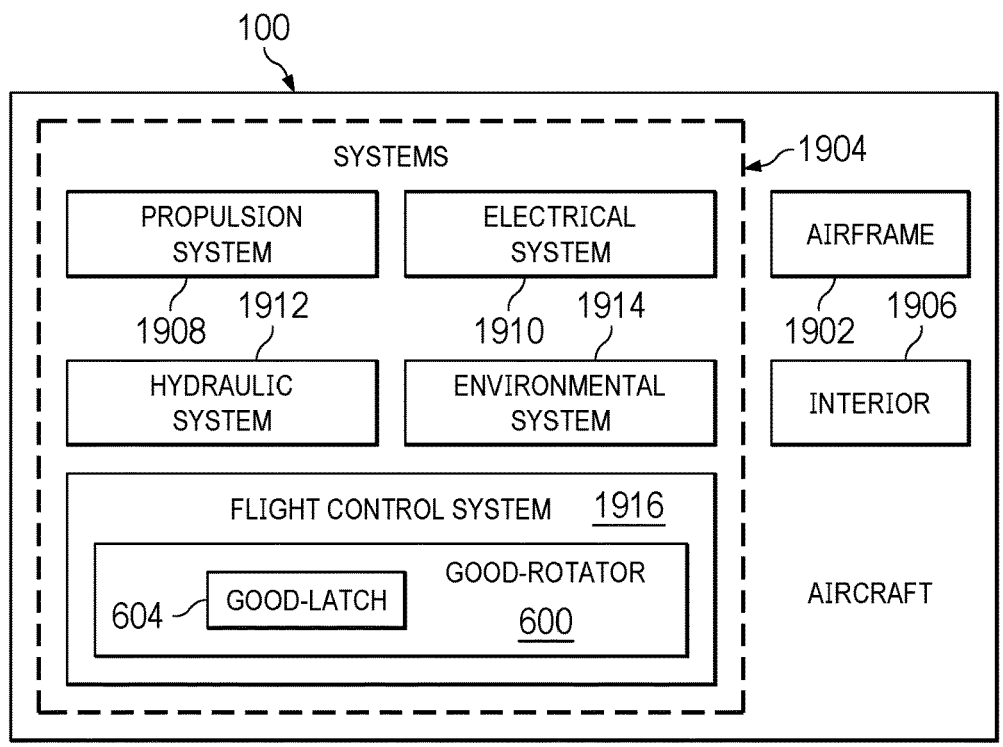
FIG. 19 an illustration of an aircraft in which an illustrative embodiment may be implemented.

Illustrative embodiments of the disclosure may be described in the context of aircraft manufacturing and service method 1800 as shown in FIG. 18 and aircraft 100 as shown in FIG. 19. Turning first to FIG. 18, FIG. 18 is an illustration of an aircraft manufacturing and service method in accordance with an illustrative embodiment. During pre-production, aircraft manufacturing and service method 1800 may include specification and design 1802 of aircraft 100 in FIG. 19 and material procurement 1804.

During production, component and subassembly manufacturing 1806 and system integration 1808 of aircraft 100 in FIG. 19 may take place. Thereafter, aircraft 100 in FIG. 19 may go through certification and delivery 1810 in order to be placed in service 1812. While in service 1812, aircraft 100 in FIG. 19 may be scheduled for routine maintenance and service 1814, which may include modification, reconfiguration, refurbishment, and other maintenance or servicing.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

Hence, described above is a novel machine and process for rotating a second structure relative to a first structure that may be described at least by the clauses below:

Clause 1. A hinge that comprises:
a cylinder that comprises a central axis;
a movable member centered around the central axis, wherein the movable member comprises an interior-extension that comprises a first notch and a second notch and a central opening;
a stationary member centered around the central axis, wherein the stationary member comprises a slot that comprise an oblong shape that extends radially away from the central opening;
a driving member centered around and configured to rotate about the central axis, wherein the driving member comprises a curved slot;
a pin, aligned parallel to the central axis, that extends through the slot and the curved slot; and
a lock-plate centered around the central axis, wherein the lock-plate comprises:
a central opening configured to surround, rotate around, and translate along a length of, the cylinder; and
a lock-disc that extends from one side of the lock-plate.

Clause 2. The hinge of clause 1, wherein:
a set of fixed-lugs extend from the stationary member configured to secure the stationary member to a first structure;
the stationary member further comprises a second central opening configured to surround the cylinder;
a set of latch-lugs extend from the stationary member configured to secure the stationary member to a second structure; and
a diameter of the pin is less than a width the slot.

Clause 3. The hinge of clause 1, wherein stationary member comprises a plurality of slots and a width of each of the slots is identical to a width of each slot in the plurality of slots and also greater than a diameter of the pin.

Clause 4. The hinge of clause 1, further comprising a plurality of the stationary member configured to retain the pin to transmit torque in double-shear.

Clause 5. The hinge of clause 1, further comprising additional notches in the movable member.

Clause 6. The hinge of clause 1, further comprising a rotation actuator connected to the movable member.

Clause 7. The hinge of clause 1, further comprising:
a plurality of the driving member; and
a shaft that connects each of the plurality of the driving member to each other.

Clause 8. The hinge of clause 1, wherein a height of the lock-disc exceeds a distance that the pin extends beyond the curved slot.

Clause 9. The hinge of clause 5, wherein each of the notches is sized to receive the pin.

Clause 10. The hinge of clause 1, wherein the curved slot comprises a latched position and an unlatched position.

Clause 11. A machine that comprises:
an actuator configured to rotate a second structure relative to a first structure;
a hinge that comprises:
a cylinder that comprises a central axis;
a movable member centered around the central axis, wherein the movable member comprises an interior-extension that comprises a first notch and a second notch and a central opening;
a stationary member centered around the central axis, wherein the stationary member comprises a slot that comprise an oblong shape that extends radially away from the central opening;
a driving member centered around and configured to rotate about the central axis, wherein the driving member comprises a curved slot;
a pin aligned parallel to the central axis and retained within the slot and the curved slot; and
a lock-plate centered around the central axis, wherein the lock-plate comprises:

a central opening configured to surround, rotate around, and translate along a length of, the cylinder; and a lock-disc that extends from one side of the lock-plate.

Clause 12. The machine of clause 11, wherein the cylinder retains a drive shaft for a rotary actuator.

Clause 13. The machine of clause 11, further comprising a second hinge mounted on the cylinder.

Clause 14. The machine of clause 11, wherein the first structure is a wing box and the second structure is a rotatable portion of a wing.

Clause 15. The machine of clause 11, further comprising:
a number of pins, wherein each pin in the number of pins comprises an identical size and a width less than a width of the slot; and
a number of slots equal to or greater than the number of pins, wherein the width of each slot in the number of slots is identical to each other.

Clause 16. The machine of clause 15, wherein:
a height of the lock-disc exceeds a distance that a pin of the number of pins extends beyond the driving member.

Clause 17. A process for rotating and fixing a second structure relative to a first structure, the process comprising:
connecting a rotation actuator to the second structure;
attaching a hinge to the first structure and the second structure;
moving a pin, extending parallel to a central axis of the hinge and through a stationary member of the hinge and a driving member of the hinge, out of a first notch of a movable member of the hinge and toward the central axis of the hinge via rotating the driving member of the hinge around the central axis;
rotating the movable member via the rotation actuator rotating the second structure around the central axis;
fixing the movable member at a desired rotation by latching the hinge via moving the pin away from the central axis and into a second notch in the movable member; and
locking the latch by moving, along a length of the central axis, a lock-plate of the hinge toward the driving member and the pin.

Clause 18. The process of clause 17, further comprising:
moving the lock-plate of the hinge toward the driving member and the pin by rotating the lock-plate around the central axis.

Clause 19. The process of clause 17, further comprising:
indicating when the pin is locked or unlocked.

Clause 20. The process of clause 17, further comprising:
forming the pin with dimensions and a material configured for carrying loads from the second structure with the pin in the first notch or the second notch.

With reference now to FIG. 19, FIG. 19 is an illustration of an aircraft in which an illustrative embodiment may be implemented. In this example, aircraft 100 may be produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, environmental system 1914, and flight control system 1916. Flight control system 1916 may include rotalliever 600 as described herein. Rotalliever 600 may include rotalatch 604. Any number of other systems may be included.

Although an aerospace example may be shown, different illustrative embodiments may be applied to other industries, such as without limitation the automotive industry or other structural manufacturing industries.

Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 100 may be in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 100 may be in service 1812 and/or during maintenance and service 1814 in FIG. 18. The use of a number of the different illustrative embodiments may substantially expedite the assembly of and/or may reduce the cost of aircraft 100.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected may be chosen and described in order to explain the principles of the embodiments, the practical application, and to enable others of ordinary skill in the art to understand the disclosure for various embodiments with various modifications as may be suited to the particular use contemplated.

What is claimed is:
1. A hinge that comprises:
a cylinder that comprises a central axis;
a movable member centered around the central axis, wherein the movable member comprises an interior-extension that comprises a first notch and a second notch and a central opening;
a stationary member centered around the central axis, wherein the stationary member comprises a slot that comprises an oblong shape that extends radially away from the central opening;
a driving member centered around and configured to rotate about the central axis, wherein the driving member comprises a curved slot;
a pin, aligned parallel to the central axis, that extends through the slot and the curved slot; and a lock-plate centered around the central axis, wherein the lock-plate comprises:
- a central opening configured to surround, rotate around, and translate along a length of, the cylinder; and
- a lock-disc that extends from one side of the lock-plate.

2. The hinge of claim 1, wherein:
a set of fixed-lugs extend from the stationary member configured to secure the stationary member to a first structure;
the stationary member further comprises a second central opening configured to surround the cylinder;
a set of latch-lugs extend from the stationary member configured to secure the stationary member to a second structure; and
a diameter of the pin is less than a width the slot.

3. The hinge of claim 1, wherein stationary member comprises a plurality of slots that comprise the slot and wherein each slot of the plurality of slots comprises an identical width that is greater than a diameter of the pin.

4. The hinge of claim 1, further comprising a plurality of the stationary member, each configured to retain the pin simultaneously to transmit torque to the pin in double-shear.

5. The hinge of claim 1, further comprising additional notches in the movable member.

6. The hinge of claim 5, wherein each of the notches is sized to receive the pin.

7. The hinge of claim 1, further comprising a rotation actuator connected to the movable member.

8. The hinge of claim 1, further comprising:
a plurality of the driving member; and
a shaft that connects each of the plurality of the driving member to each other.

9. The hinge of claim 1, wherein a height of the lock-disc exceeds a distance that the pin extends beyond the curved slot.

10. The hinge of claim 1, wherein the curved slot comprises a latched position and an unlatched position.

11. A machine that comprises:
an actuator configured to rotate a second structure relative to a first structure;
a hinge that comprises:
- a cylinder that comprises a central axis;
- a movable member centered around the central axis, wherein the movable member comprises an interior-extension that comprises a first notch and a second notch and a central opening;
- a stationary member centered around the central axis, wherein the stationary member comprises a slot that comprises an oblong shape that extends radially away from the central opening;
- a driving member centered around and configured to rotate about the central axis, wherein the driving member comprises a curved slot;
- a pin aligned parallel to the central axis and retained within the slot and the curved slot; and
- a lock-plate centered around the central axis, wherein the lock-plate comprises:
  - a central opening configured to surround, rotate around, and translate along a length of, the cylinder; and
  - a lock-disc that extends from one side of the lock-plate.

12. The machine of claim 11, wherein the cylinder retains a drive shaft for the actuator.

13. The machine of claim 11, further comprising a second hinge mounted on the cylinder.

14. The machine of claim 11, wherein the first structure is a wing box and the second structure is a rotatable portion of a wing.

15. The machine of claim 11, further comprising:
a number of pins that comprise the pin, wherein each pin in the number of pins comprises an identical size and a diameter less than a width of the slot; and
a number of slots equal to or greater than the number of pins, wherein the number of slots comprises the slot and the width of each slot in the number of slots is identical to each other.

16. The machine of claim 15, wherein:
a height of the lock-disc exceeds a distance that a pin of the number of pins extends beyond the driving member.

17. A process for rotating and fixing a second structure relative to a first structure, the process comprising:
connecting a rotation actuator to the second structure;
attaching a hinge to the first structure and the second structure;
moving a pin, extending parallel to a central axis of the hinge and through a stationary member of the hinge and a driving member of the hinge, out of a first notch of a movable member of the hinge and toward the central axis of the hinge via rotating the driving member of the hinge around the central axis;
rotating the movable member via the rotation actuator rotating the second structure around the central axis;
fixing the movable member at a desired rotation by latching the hinge via moving the pin away from the central axis and into a second notch in the movable member; and
locking the latch by moving, along a length of the central axis, a lock-plate of the hinge toward the driving member and the pin.

18. The process of claim 17, further comprising:
moving the lock-plate of the hinge toward the driving member and the pin by rotating the lock-plate around the central axis.

19. The process of claim 17, further comprising:
indicating when the pin is locked or unlocked.

20. The process of claim 17, further comprising:
forming the pin with dimensions and a material configured for carrying loads from the second structure with the pin in the first notch or the second notch.

* * * * *